(12) United States Patent
Fujiyoshi et al.

(10) Patent No.: US 8,104,344 B2
(45) Date of Patent: Jan. 31, 2012

(54) ANGULAR VELOCITY SENSOR UTILIZING CORIOLIS FORCE

(75) Inventors: Motohiro Fujiyoshi, Seto (JP); Yutaka Nonomura, Nagoya (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 501 days.

(21) Appl. No.: 12/318,015

(22) Filed: Dec. 19, 2008

(65) Prior Publication Data

US 2009/0158847 A1 Jun. 25, 2009

(30) Foreign Application Priority Data

Dec. 21, 2007 (JP) ................................. 2007-330087

(51) Int. Cl.
 *G01P 9/04* (2006.01)
 *G01C 19/56* (2006.01)
(52) U.S. Cl. ................ 73/504.12; 73/504.14; 73/504.04
(58) Field of Classification Search ............... 73/504.12, 73/504.14, 504.04, 504.02, 504.15
See application file for complete search history.

(56) References Cited

U.S. PATENT DOCUMENTS

| | | | | |
|---|---|---|---|---|
| 5,728,936 A | * | 3/1998 | Lutz ........................... | 73/504.14 |
| 5,945,599 A | * | 8/1999 | Fujiyoshi et al. .......... | 73/504.12 |
| 6,070,463 A | * | 6/2000 | Moriya et al. .............. | 73/504.12 |
| 6,122,962 A | * | 9/2000 | Yoshino et al. ............ | 73/504.14 |
| 6,327,907 B1 | * | 12/2001 | Park .......................... | 73/504.12 |
| 6,543,285 B2 | * | 4/2003 | Hashimoto ................ | 73/504.14 |
| 6,845,669 B2 | * | 1/2005 | Acar et al. ................. | 73/504.14 |
| 2005/0241364 A1 | | 11/2005 | Fujiyoshi et al. | |
| 2006/0055096 A1 | | 3/2006 | Ito et al. | |

FOREIGN PATENT DOCUMENTS

| | | |
|---|---|---|
| JP | A 9-119942 | 5/1997 |
| JP | A-10-170276 | 6/1998 |
| JP | A-2000-097709 | 4/2000 |
| JP | A 2000-180175 | 6/2000 |
| JP | A 2002-162229 | 6/2002 |
| JP | A-2005-292125 | 10/2005 |
| JP | A 2006-58021 | 3/2006 |
| JP | A-2006-317462 | 11/2006 |
| JP | A 2007-232710 | 9/2007 |
| WO | WO 93/05401 A1 | 3/1993 |

OTHER PUBLICATIONS

Japanese Office Action with English-language translation mailed Nov. 10, 2009 for Japanese Patent Application No. 2007-330087.
Office Action issued in Japanese Patent Application No. 2007-330087, mailed on Apr. 13, 2010 (with translation).

* cited by examiner

*Primary Examiner* — Helen C. Kwok
(74) *Attorney, Agent, or Firm* — Oliff & Berridge, PLC

(57) ABSTRACT

Beams 70*a*, 70*b*, 70*c* and, 70*d* of an angular velocity sensor 100 is provided with a folded type beam 73 that has a spring constant which is smaller along the excitation direction (x-axis direction) than along a detecting direction (y-axis direction), and a straight type beam 75 that has a spring constant which is smaller along the detecting direction (y-axis direction) than along the excitation direction (x-axis direction). The folded type beam 73 is arranged closer to the mass portion 40 than the straight type beam 75. The detecting member 60 is disposed on a farther beam portion of the beam 70*b*, wherein the farther beam portion is arranged farther away from the mass portion 40 than the folded type beam 73.

8 Claims, 17 Drawing Sheets

ANGULAR VELOCITY SENSOR UTILIZING CORIOLIS FORCE

CROSS REFERENCE TO RELATED APPLICATION

This application claims priority to Japanese Patent Application No. 2007-330087 filed on Dec. 21, 2007, the contents of which are hereby incorporated by reference into the present application.

BACKGROUND OF THE INVENTION

1. Field of the Invention

This invention is related to an angular velocity sensor utilizing coriolis force.

2. Description of the Related Art

A typical angular velocity sensor that uses coriolis force comprises a substrate, a mass portion, an excitation member, a beam and a detecting member. The excitation member forcefully exits the mass portion in an excitation direction. One end of the beam is connected to the mass portion while the other end thereof is fixed to the substrate. The detecting member detects the vibration of the mass portion. The beam is capable of flexibly fluctuating in the excitation direction as well as in a detecting direction, and supports the mass portion so as to enable the mass portion to move in the excitation direction as well as in the detection direction.

The excitation member typically is composed of segmented electrode. The segmented electrode comprises movable electrode that is arranged on the mass portion side, and fixed electrode that is arranged on the substrate side. When an alternating current voltage is applied to the segmented electrode, electrostatic attraction is generated between the movable electrode and the fixed electrode, thereby enables the mass portion to vibrate in the excitation direction.

The detecting member is typically a capacitor that is configured of a plane electrode arranged on the mass portion side and another plane electrode arranged on the substrate side. The plane electrodes on the mass portion side and the substrate side face each other along the detecting direction.

In this type of angular velocity sensor, in a case where angular velocity is applied to the mass portion while it is being excited in the excitation direction, a coriolis force occurs in a direction (i.e. the detecting direction) that is orthogonal to both the excitation direction of the mass portion and an axial direction of rotation of the angular velocity, which forces the mass portion to waver in the detecting direction. In such a case, due to the vibration of the mass portion in the detecting direction, the distance between the plane electrodes on the mass portion side and the substrate side which constructs the capacitor, i.e. the detecting member, is thereby changed; consequently, this change in the distance causes the electrostatic capacitance of the capacitor to modulate. The angular velocity sensor detects the vibration of the mass portion in the detecting direction from the aforesaid modulation of electrostatic capacitance, and utilizes the detection results in the calculation of the angular velocity that had been applied on the angular velocity sensor. Such type of angular velocity sensor is disclosed in Japanese Patent Application Publication Nos. 1-170276 and 2005-292125.

BRIEF SUMMARY OF THE INVENTION

As mentioned above, it is the norm of the aforementioned type of angular velocity sensor to have the detecting member directly coupled onto the mass portion. Hence, in the course of exciting the mass portion in the excitation direction, undesirable conditions such as a change in the amount of area within which the plane electrodes of the detecting member face each other is incurred due to the exciting movement of the mass portion, which may give rise to serious error in detection. Moreover, the amplitude of the vibration of the mass portion in the excitation direction is in general significantly larger than its amplitude of vibration in the detecting direction that is caused by the coriolis force. Thus in the cases where the detecting member is directly coupled to the mass portion, the excitation of the mass portion gives negatively affects the detection result of the detecting member. In light of this, the present teachings disclosed herein aims to provide a technique that prevents the excitation of the mass portion in the excitation direction from affecting the detection result of the detecting member.

The technique disclosed in the present specification is characteristic in having the detecting member disposed on the beam. In the course of the mass portion being vibrated in the detecting direction, the beam is also oscillating in the detecting direction. In the technique disclosed in the present specification, the displacement (in its vibrating movement) of the mass portion in the detecting direction is detected in an indirect manner by detecting the vibration of the beam in the detecting direction. Furthermore, in the technique disclosed in the present specification, the beam is characteristic in having been partitioned into a plurality of portions that have different spring constants. The beam comprises at least a first portion whose spring constant along the excitation direction is lower than its spring constant along the detecting direction, and a second portion whose spring constant along the detecting direction is lower than its spring constant along the excitation direction. Furthermore, the first portion is arranged closer to the mass portion than the second portion, and the first detecting member is disposed on a farther beam portion of the beam. The farther beam portion is arranged farther away from the mass portion than the first portion. The farther beam portion may or may not be a part of the second portion of the beam (and vice versa). With the aforementioned configuration of the beam, in cases where the mass portion is excited in the excitation direction, the fist portion most easily fluctuates flexibly in accordance therewith. Hence, in the farther beam portion of the beam, the influence of excitation amplitude is suppressed, and thereby a stable condition is maintained in the farther beam portion. Thus, the detecting member that is disposed on the farther beam portion is able to carry out detection operation under a condition in which influence of excitation amplitude of the mass portion is substantially eliminated. Furthermore, in cases where the mass portion vibrated in the detecting direction due to the coriolis force, the second portion most easily fluctuates flexibly in accordance therewith. Thus, in cases where the mass portion vibrated in the detecting direction because of the coriolis force, the entire beam is capable of vibrating in the detecting direction. As a result, the detecting member disposed on the beam is able to detect the vibration of the beam in the detecting direction; furthermore, the detecting member is able to indirectly detect the vibration of the mass portion in the detecting direction. By employing the aforementioned configuration of the beam and the detecting member, the angular velocity that is casted upon the angular velocity can be measured accurately.

That is, the angular velocity sensor disclosed herein comprises a substrate, a mass portion, an excitation member that excites the mass portion along an excitation direction, a beam supporting the mass portion so that the mass portion capable of being displaced at least along the excitation direction and a first detecting direction that is orthogonal to the excitation direction, the beam comprises a first portion and a second portion, and one end of the beam is connected with the mass portion and other end of the beam is connected with the substrate, and a first detecting member disposed on the beam, the first detecting member detects the vibration of the beam along the first detecting direction. The spring constant of the first portion along the excitation direction is lower than the spring constant of the first portion along the first detecting direction, and the spring constant of the second portion along the first detecting direction is lower than the spring constant of the second portion along the excitation direction. The first portion is arranged closer to the mass portion than the second portion. The first detecting member is disposed on a farther beam portion of the beam, wherein the farther beam portion is arranged farther away from the mass portion than the first portion. It should be noted that the first detecting direction may be a direction that is parallel to the substrate, or may be a direction that is orthogonal to a surface of the substrate.

DETAILED DESCRIPTION OF THE INVENTION

Figure 1:
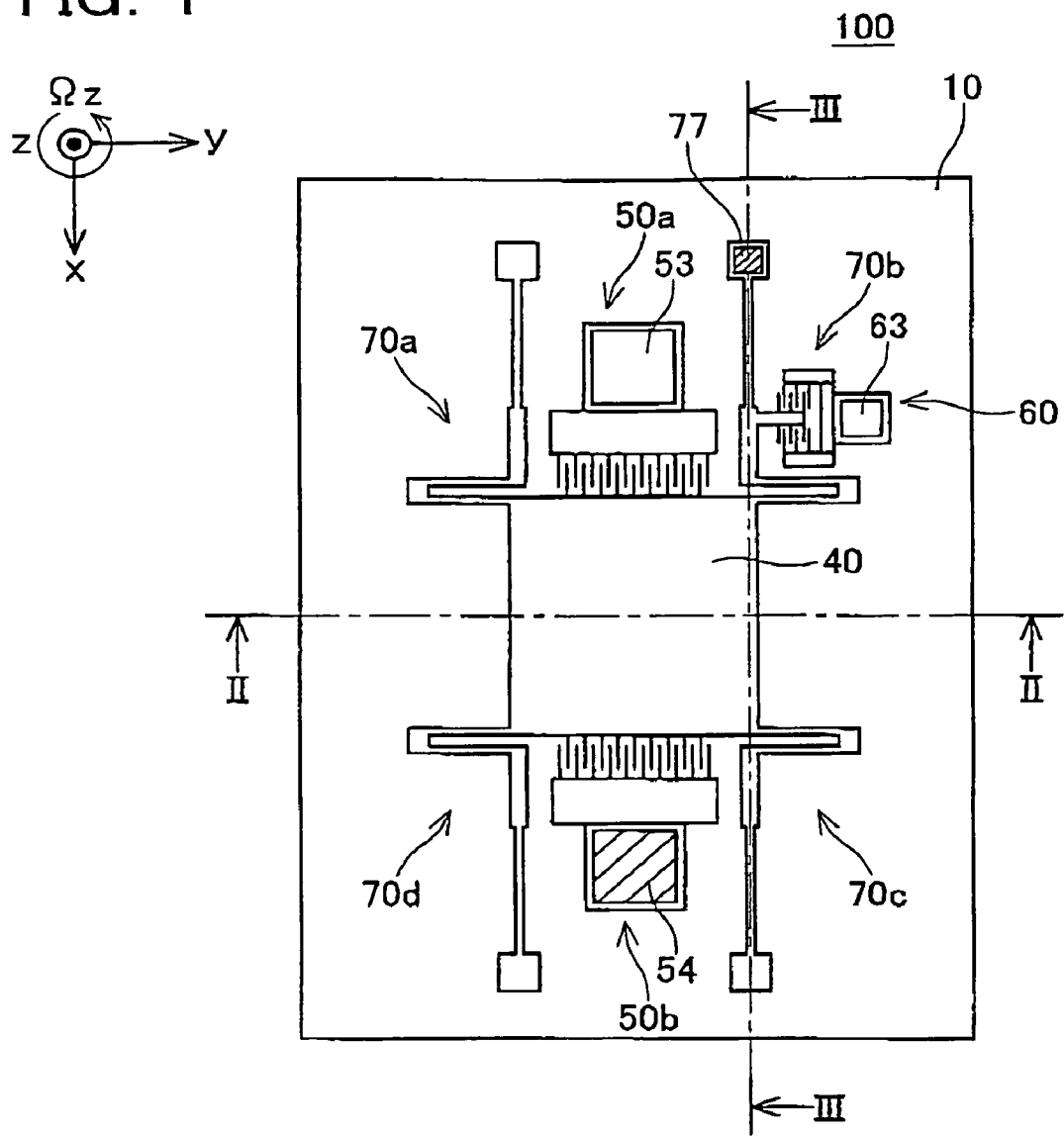
FIG. 1 shows a plan view of an angular velocity sensor of the first embodiment.

The angular velocity sensor of the present embodiment comprises at least a substrate, a mass portion, an excitation member, a beam and a first detecting member. The excitation member excites the mass portion along an excitation direction. The beam supports the mass portion so that the mass portion capable of being displaced at least along the excitation direction and a first detecting direction that is orthogonal to the excitation direction. In addition, the beam comprises a first portion and a second portion. The first detecting member is disposed on the beam, and detects the vibration of the beam along the first detecting direction. The spring constant of the first portion of the beam along the excitation direction is lower than the spring constant of the first portion of the beam along the first detecting direction. The spring constant of the second portion of the beam along the first detecting direction is lower than the spring constant of the second portion of the beam along the excitation direction. Furthermore, the first portion of the beam is arranged closer to the mass portion than the second portion of the beam. Moreover, the first detecting member is disposed on a farther side of the beam that is father away from the mass portion than the first portion. It may also be said that the first detecting member is disposed on an opposite side of the mass portion with respect to the first portion.

In the angular velocity sensor above, it is preferable that the excitation direction and the first detecting direction are parallel to the surface of the substrate. According to this angular velocity sensor, the first detecting member is able to detect the angular velocity that has the axis direction of rotation along the orthogonal direction with respect to the surface of the substrate.

In cases where the excitation direction and the first detecting direction are parallel to the surface of the substrate, it is preferable that the first portion of the beam is a folded type beam including a pair of beams extending along the first detecting direction. Moreover, it is preferable that the second portion of the beam is a straight type beam including a straight beam extending along the excitation direction. In the folded type beam, the pair of beams is capable of being flexibly fluctuating in the excitation direction while the fluctuation (or bending) in the first detecting direction is restricted. In the straight type beam, on the other hand, the straight beam is capable of being flexibly fluctuating in the detecting direction while the fluctuation (or bending) in the excitation direction is restricted. By utilization of both the folded type beam and the straight type beam in combination, the technique disclosed in the present specification can easily be materialized.

In cases where the excitation diction and the first detecting direction are parallel to the surface of the substrate, it is preferable that the angular velocity sensor further comprises a second detecting member that directly or indirectly detects the vibration of the mass portion along a second detecting direction that is orthogonal to the surface of the substrate. According to this angular velocity sensor, while the first detecting member detects the angular velocity that has the axis direction of rotation along the orthogonal direction with respect to the surface of the substrate, the second detecting member is capable of detecting the angular velocity that has the axis direction of rotation along a direction parallel to the surface of the substrate. With the configuration of having the first and second detecting members, a single angular velocity sensor can detect angular velocities of two different axes.

In the angular velocity sensor above, it is preferable that the second detecting member comprises a first arm and a second arm. The first arm extends from the mass portion and faces a surface of a part of the substrate with a space therebetween. The second arm extends from the substrate and faces a surface of a part of the mass portion with a space therebetween. The first arm and the part of the substrate together configure a first capacitor. Likewise, the second arm and the part of the mass portion configure a second capacitor. According to this second detecting member, when the mass portion is displaced (vibrated) along the orthogonal direction with respect to the surface of the substrate, the space in one of the first capacitor and the second capacitor becomes broader, and the space in the other of the first capacitor and the second capacitor becomes narrower. Specifically, when the mass portion is displaced in the second detecting direction and the distance of the space in the first capacitor increases (or decreases), the distance of the space in the second capacitor decreases (or increases). For example, the distance of the space and the area amount of "facing area", in which the arms and the respective counterparts (i.e. the substrate in the first capacitor and the mass portion in the second capacitor) face each other within the aforesaid space, may be predeterminedly set identical in the first capacitor and the second capacitor under a state in which no force is exerted onto either of the capacitors. In this case, when the mass portion is displaced in the second detecting direction, the amount of increase (or decrease) in the electrostatic capacitance of the first capacitor to equal to the decrease (or increase) in the electrostatic capacitance of the second capacitor. Under such configuration, it is possible to detect the change in the electrostatic capacitance with twice as much sensitivity by calculating the difference of the capacitance change in the first capacitor and that of the second capacitor.

In the angular velocity sensor above, it is preferable that the spring constant of the first portion of the beam along the second detecting direction is higher than the spring constant of the second portion of the beam along the second detecting direction. In this case, it is preferable that the second detecting member is disposed on the farther beam portion. With the configuration of the beam as above, when the mass portion is excited in the excitation direction, the first portion of the beam has the largest pliancy to be bent along the excitation direction. Hence, the second detecting member that is arranged at the farther beam portion is able to operate detection under a condition in which the influence of the excitation amplitude of the mass portion is decreased. On the other hand, in a case where the mass portion vibrated in the second detecting direction because of the coriolis force exerted thereupon, the second portion has the largest pliancy to be bent along the second detecting direction. Hence, when the mass portion oscillate in the second detecting direction due to the coriolis force, the whole of the beam is able to move along the second detecting direction. As a result, the second detecting member arranged at the farther beam portion is able to detect the vibration of the beam in the second detecting direction; that is, the second detecting member is able to detect the vibration of the mass portion in the second detecting direction in an indirect manner.

In the angular velocity sensor above with the second detecting member being arranged at the farther beam portion of the beam, it is preferable that the second detecting member further comprises a third arm and a fourth arm. The third arm extends from the farther beam portion and faces the surface of a part of the substrate with a space therebetween. The forth arm extends from the substrate and faces the surface of a part of the father beam portion with a space therebetween. The third arm and the part of the substrate configure a third capacitor. The forth arm and the part of the farther beam portion configure a fourth capacitor. According to this configuration, when the farther beam portion is displaced along the second detecting direction, the space of one of the third capacitor and the forth capacitor becomes broader, and the space of the other of the third capacitor and the forth capacitor becomes narrower.

In the angular velocity sensor above, it is preferable that in a case where an excitation frequency of resonance along the excitation direction based on the mass portion and the beam is fx, a frequency of resonance along the first detecting direction based on the mass portion and the beam is fy, and a frequency of resonance along the second detecting direction based on the mass portion and the beam is fz, one of the following relation (1) fy<fx<fz and (2) fz<fx<fy is obtained. Under a condition in which the frequency of resonances fy and fz, in which coriolis force is generated, respectively vary from the excitation frequency of resonance fx, the responsiveness is improved in the angular velocity sensor. In the aforementioned configuration, both the frequency of resonance fy as well as the frequency of resonance fz are unmatched with the excitation frequency of resonance fx; which enables the responsiveness in the respective directions in the biaxial angular velocity sensor. Furthermore, the frequency of resonance fy and fz are set such that the excitation frequency of resonance fx resides in the intermediate level in between the two frequencies. That is, the frequency of resonances fy and fz vary from each other as well. Hence, the influence of vibration in the first detecting direction that corresponds to the frequency of resonance fy that is exerted upon the vibration in the same direction that corresponds to the frequency of resonance fz is also decreased. According to the above technique, a biaxial angular velocity sensor with significant attributes can be realized.

In the angular velocity sensor above, it is preferable that, in a case where an absolute value of difference between the excitation frequency of resonance fx and the frequency of resonance fy is $\Delta fxy$ and an absolute value of difference between the excitation frequency of resonance fx and the frequency of resonance fz is $\Delta fxz$, the $\Delta fxy$ and $\Delta fxz$ are substantially equal. According to this biaxial angular velocity sensor, since the vibration in both of the detecting directions are subject to the influence of the excitation of the mass portion, the model elements for the capacitance detection circuit that is arranged for each of the axes can be set identically.

In the angular velocity sensor above, as an alternative technique for the detection of the displacement in the electrostatic capacitance of the capacitor, change in magnetic field, optical field or optical intensity may be detected.

In the angular velocity sensor above, it is preferable that the relation of the frequency of resonance is fy<fx<fz. This is useful in preventing a sticking phenomenon to occur between the mass portion and the substrate.

In the angular velocity sensor above, the beam may comprise a connecting portion (e.g. a beam connecting portion) whose spring constant is large in both the detecting direction and the excitation direction. The connecting portion may be arranged between the first portion (e.g. the folded type beam) of the beam and the second portion (e.g. the straight type beam) of the beam. The detecting member may be disposed at the connecting portion. Furthermore, a detecting member whose detecting direction is along the y axis that is parallel with the surface of the substrate may be arranged in the connection portion. Moreover, a detecting member whose detecting direction is along the z axis that is orthogonal to the surface of the substrate may be arranged in the connecting portion.

First Embodiment

Figure 2:
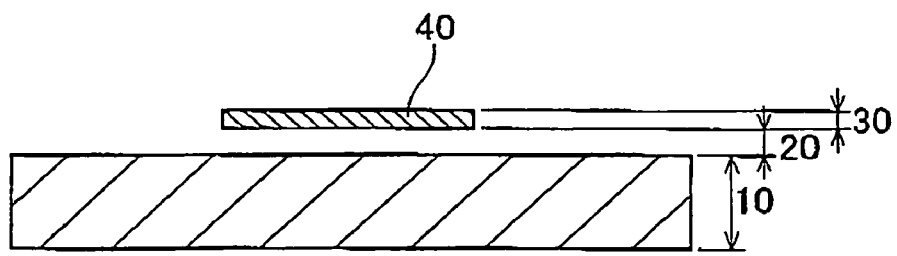
FIG. 2 shows a cross-sectional view along line II-II of FIG. 1.
Figure 3:
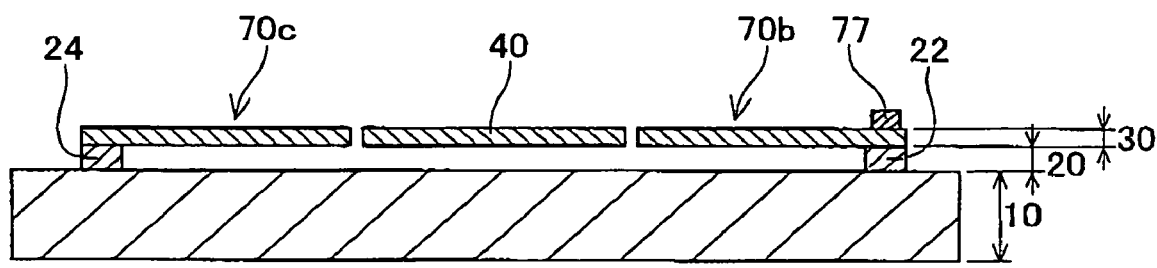
FIG. 3 shows a cross-sectional view along line III-III of FIG. 1.

The first embodiment of the present teachings is described below with reference to the drawings. FIGS. 1-3 show the schematic configuration of an angular velocity sensor 100. FIG. 1 shows a plan view of the angular velocity sensor 100. FIG. 2 shows a cross-sectional view along line II-II of FIG. 1. FIG. 3 shows a cross-sectional view along line III-III of FIG. 1. As shown in FIGS. 1-3, the angular velocity sensor 100 is materialized in utilizing SOI (Silicon on Insulator) substrate. The SOI substrate comprises a configuration that includes a semiconductor lower layer 10, insulating layer 20 and semiconductor upper layer 30 in a stacked manner. A crystalline silicon is used for the semiconductor lower layer 10 and the semiconductor upper layer 30, and a silicon oxide is used for the insulating layer 20. High density of impurities is included in the semiconductor upper layer 30, and the layer is thereby endowed with conductivity. As will be described later, the angular velocity sensor 100 is formed by utilizing etching techniques such that parts of the insulating layer 20 and the semiconductor upper layer 30 are removed.

As shown in FIG. 1, the angular velocity sensor 100 comprises the semiconductor lower layer 10, a mass portion 40, excitation member 50*a* for exciting the mass portion 40 in the excitation direction (i.e. the x-axis direction), a plurality of beams 70*a*, 70*b*, 70*c*, 70*d* that supports the mass portion 40 in a manner that the mass portion 40 is capable of being displaced (vibrated), and a detecting member 60 that is disposed on the beam 70*b*. The angular velocity sensor 100 detects angular velocity by using coriolis force. That is, the angular velocity sensor 100 excites the mass portion 40 in the excitation direction (x-axis direction) by utilizing excitation member 50*a*, and, in a case where an angular velocity whose rotational axis direction coincides with the orthogonal direction with respect to the surface of the semiconductor lower layer 10 (i.e. the z-axis direction) is applied to the mass portion 40, the sensor utilizes of the phenomenon of coriolis force, which is generated in the detecting direction (y-axis direction) that is vertical to both the excitation direction of the mass portion 40 (i.e. x-axis direction) and the rotational axis direction of the angular velocity (i.e. z-axis direction). The angular velocity sensor 100 detects the vibration of the mass portion 40 in the detecting direction (y-axis direction) and converts it to the angular velocity that had been imposed on the angular velocity sensor 100.

The detailed configuration of the angular velocity sensor 100 will be described below with reference to the figures. As shown in FIG. 2, the insulating layer 20 between the mass portion 40 and the semiconductor lower layer 10 is removed, and the mass portion 40 is supported above the semiconductor lower layer 10 in a floating manner. The mass portion 40 is formed by utilizing a part of the semiconductor upper layer 30.

Figure 4:
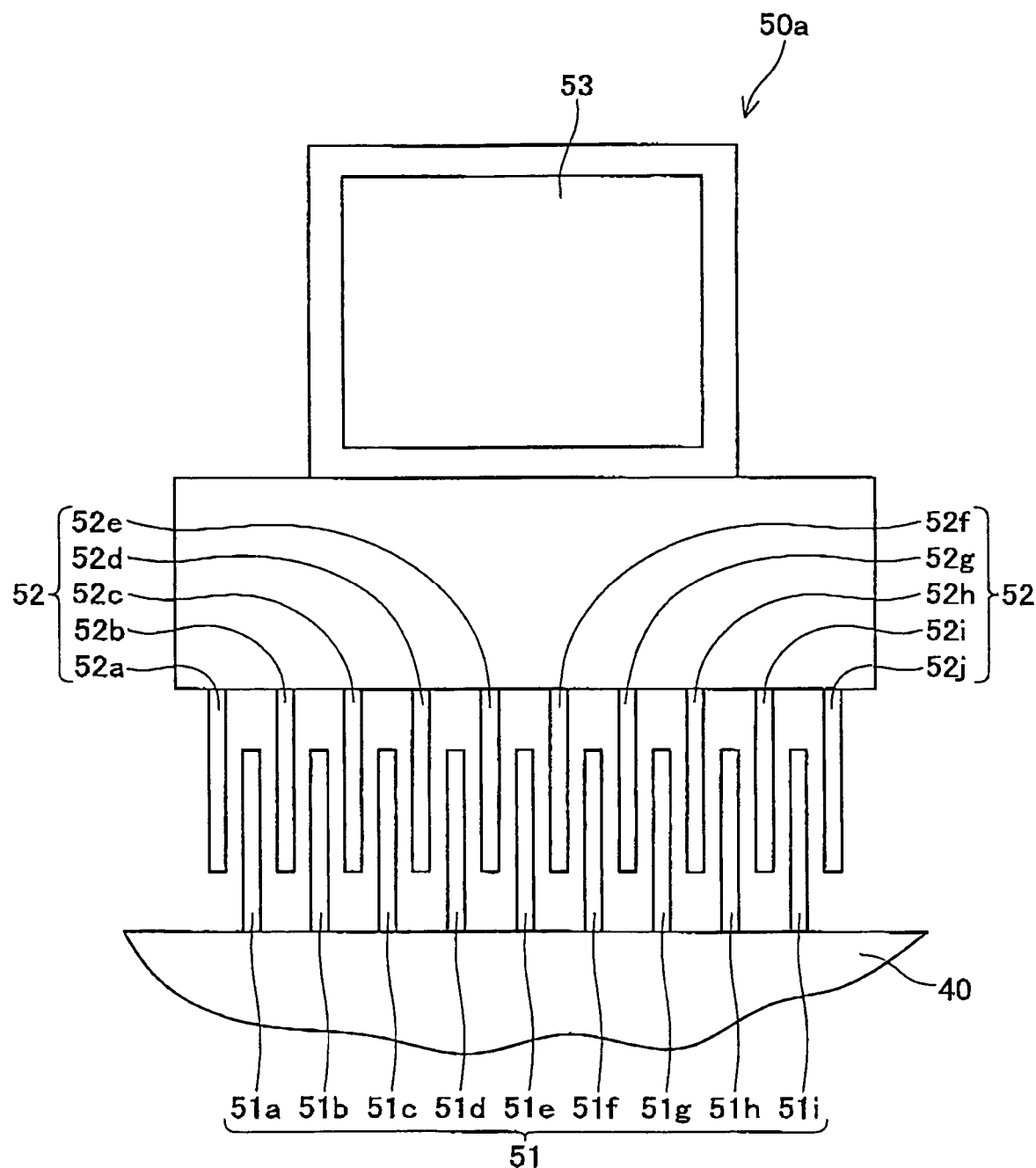
FIG. 4 shows a schematic enlarged view of an excitation member.

As shown in FIG. 1, the excitation member 50*a* is arranged on one side surface of the mass portion 40. FIG. 4 shows a schematic enlarged view of the excitation member 50*a*. The excitation member 50*a* comprises a movable electrode 51, a fixed electrode 52 and a fixed electrode terminal 53. The movable electrode 51 and the fixed electrode 52 are formed by processing a part of the insulating layer 20 and the semiconductor upper layer 30 with the etching technique. One end of the movable electrode 51 is connected to the mass portion 40. The insulating layer 20 between the movable electrode 51 and the semiconductor lower layer 10 is removed, and thus the movable electrode 51 is supported, in accordance with the mass portion 40, in a floating manner. The movable electrode 51 is formed by utilizing a part of the semiconductor upper layer 30. The insulating layer 20 between the fixed electrode 52 and the semiconductor lower layer 10 is, to the contrary, not removed; the fixed electrode 52 is fixed onto the semiconductor lower layer 10 via a part of the insulating layer 20. The fixed electrode terminal 53 is disposed on the semiconductor upper layer 30.

The movable electrode 51 comprises nine movable electrode fingers 51*a*-51*i*. The fixed electrode 52 comprises ten fixed electrode fingers 52*a*-52*j*. Each of the movable electrode fingers 51*a*-51*i* of the movable electrode 51 and the fixed electrode fingers 52*a*-52*j* are arranged so that they are geared in between the fingers of each other, thereby configuring a segmented electrode.

When AC voltage is applied to the fixed electrode terminal 53, electrostatic attraction is generated among the fingers 51*a*-51*i* of the movable electrode 51 and the fingers 52*a*-52*j* of the fixed electrode 52. With the electrostatic attraction generated therewith, the mass portion 40 can be excited in the excitation direction (the x-axis direction).

Furthermore, as shown in FIG. 1, the angular velocity sensor 100 comprises an excitation amplitude detecting member 50*b* at a position opposite to where the excitation member 50*a* is arranged with the mass portion in between the two. The excitation amplitude detecting member 50*b* comprises identical configuration as that of the excitation member 50*a*. The excitation amplitude detecting member 50*b* detects the excitation amplitude of the mass portion 40 from the change in the electrostatic capacitance of the segmented electrode, and feeds back the detection result to the excitation member 50*a*. Based on the detection result obtained by the excitation amplitude detecting member 50*b*, the excitation member 50*a* adjusts the AC voltage to be applied and controls the excitation of the mass portion 40.

As shown in FIG. 1, each of the beam 70*a*, 70*b*, 70*c* and 70*d* are arranged at a respective corners of the mass portion 40. As shown in FIG. 3, the insulating layer 20 between beams 70*b*, 70*c* and the semiconductor lower layer 10 is in part removed. Each of the beams 70*b* and 70*c* has one end connected to the corner of the mass portion 40, while the other end is fixed to the semiconductor lower layer 10 via a part of the insulating layer 20, namely part 22 and 24. It should be noted that beams 70*a* and 70*d* also has the same configuration. In the configuration as described above, the beams 70*a*, 70*b*, 70*c*, 70*d* support the mass portion 40 floating above the semiconductor lower layer 10. The beams 70*a*, 70*b*, 70*c*, 70*d* are formed by utilizing a part of the semiconductor upper layer 30.

Furthermore, as shown in FIGS. 1 and 3, an earth electrode terminal 77 is arranged on the surface of an end portion of beam 70*b*. The earth electrode terminal 77 is fixed to the earth potential. As described above, the semiconductor upper layer 30 includes a high density of impurities and thus is conductive. Thus, the potential of a whole of the semiconductor upper layer 30 is connected to the earth potential. In a case where the surface area of the earth electrode terminal 77 should be made large in order to make contacts with wirings and the like, the area of the end portion of the beam 70*b* may be enlarged. Alternately, a base for arranging the earth electrode terminal 77 may be disposed in the vicinity of the end portion of the beam 70*b*.

Figure 5:
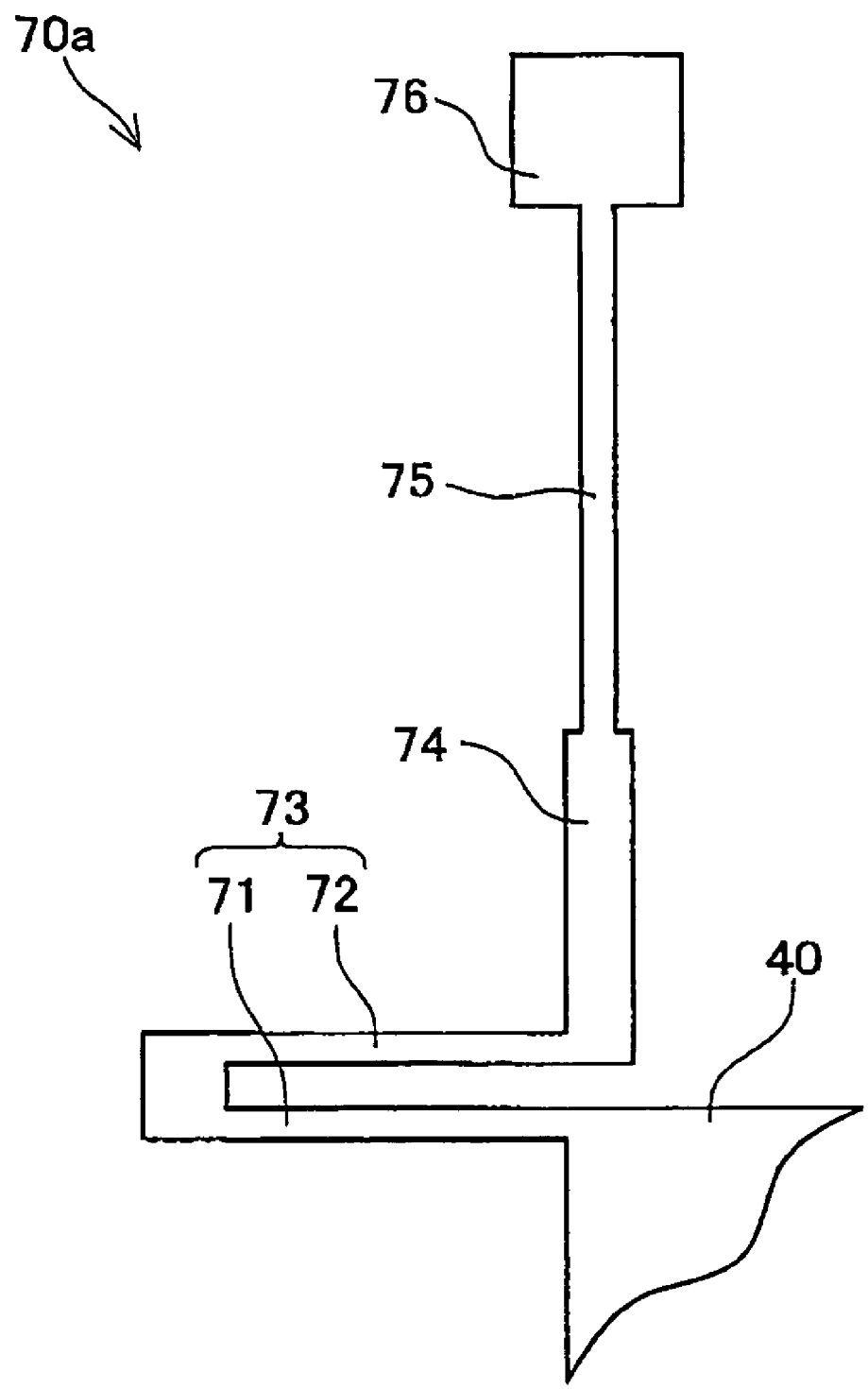
FIG. 5 shows a schematic enlarged view of a beam.

FIG. 5 shows a schematic enlarged view of the beam 70*a*. Note that the other beams 70*b*, 70*c*, 70*d* has the identical configuration as that of the beam 70*a*. As shown in FIG. 5, the beam 70*a* comprises a folded type beam 73 (an example of the "first portion"), a straight type beam 75 (an example of the "second portion") and a beam connecting portion 74 that connects the folded type beam 73 and the straight type beam 75.

The folded type-beam 73 is configured of a pair of x-axis beams 71, 72 that extend along the detecting direction (y-axis direction). The folded type beam 73 flexibly fluctuates, or bends, in the excitation direction (x-axis direction) while the fluctuation (or bending) in the detecting direction (y-axis direction) is restricted.

The straight type beam 75 is configured of a y-axis beam that extends along the excitation direction (x-axis direction). Fluctuation in the detecting direction (y-axis direction) is allowed while the fluctuation (or bending) in the excitation direction (x-axis direction) is restricted.

Hence, the spring constant of the folded type beam 73 in the excitation direction (x-axis direction) is smaller than the spring constant of the straight type beam 75 in the same direction (x-axis direction). In addition, the spring constant of the straight type beam 75 in the detecting direction (y-axis direction) is smaller than the spring constant of the folded type beam 73 in the same direction (y-axis direction)

The beam connecting portion 74 is configured of a beam that extend in the excitation direction (x-axis direction). The beam of the beam connecting portion 74 is wider in the y-axis direction than the y-axis beam of the straight type beam 75. Thus, the beam connecting portion 74 has a spring constant that is large in both the excitation direction (x-axis direction) and the detecting direction (y-axis direction), which consequently restricts the fluctuation in both directions. It may also be said that the spring constant of the beam connecting portion 74 in the excitation direction (x-axis direction) is larger than that of the folded type beam 73, and the spring constant of the beam connecting portion 74 in the detecting direction (y-axis direction) is larger than that of the straight type beam 75. A fixing portion is arranged at one end of the beam 70*a*, and the fixing portion is fixed to the semiconductor lower layer 10 via a part of the insulating layer 20.

Figure 6:
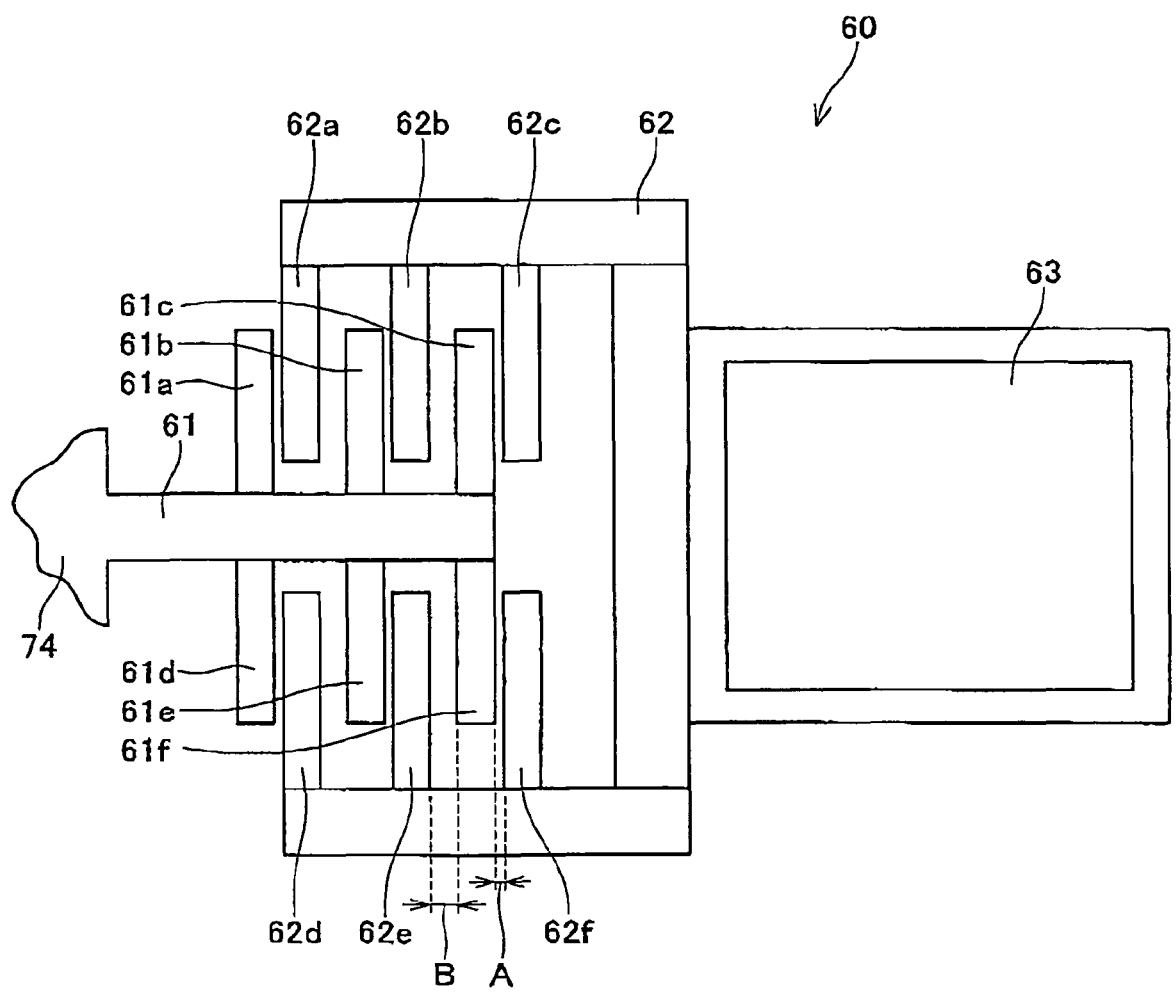
FIG. 6 shows a schematic enlarged view of a detecting member.

As shown in FIG. 1, the detecting member 60 is disposed on the beam 70*b*. FIG. 6 shows a schematic enlarged view of the detecting member 60. The detecting member 60 comprises a movable electrode 61, a fixed electrode 62 and a fixed electrode terminal 63. The movable electrode 61 and the fixed electrode 62 are formed by processing a part of the insulating layer 20 and the semiconductor upper layer 30 with the etching technique. One end of the movable electrode 61 is connected to the beam connecting portion 74 of the beam 70*b*. The insulating layer 20 between the movable electrode 61 and the semiconductor lower layer 10 is removed, and thus the movable electrode 61 is supported, in accordance with the beam 70*b*, in a floating manner. The movable electrode 61 is formed by utilizing a part of the semiconductor upper layer 30. The insulating layer 20 between the fixed electrode 62 and the semiconductor lower layer 10 is, to the contrary, not removed; the fixed electrode 62 is fixed onto the semiconductor lower layer 10 via a part of the insulating layer 20. The fixed electrode terminal 63 is disposed on the semiconductor upper layer 30.

The movable electrode 61 comprises six movable electrode fingers 61*a*-61*f*. The movable electrode fingers 61*a*-61*f* align with the same interval along the y-axis direction in pairs. The fixed electrode 62 comprises six fixed electrode fingers 62*a*-62*f*. The fixed electrode fingers 62*a*-62*f* align with the same interval along the y-axis direction in pairs.

Each of the movable electrode fingers 61*a*, 61*b*, 61*c* of the movable electrode 61 that extend along the negative direction of the x-axis and the fixed electrode fingers 62*a*, 62*b*, 62*c* of the fixed electrode 62 that extend along the positive direction of the x-axis are arranged so that they are geared in between the fingers of each other. Likewise, each of the movable electrode fingers 61*d*, 61*e*, 61*f* of the movable electrode 61 that extend along the positive direction of the x-axis and the fixed electrode fingers 62*d*, 62*e*, 62*f* of the fixed electrode 62 that extend along the negative direction of the x-axis are arranged so that they are geared in between the fingers of each other.

As shown in FIG. 6, the distance between the movable electrode finger 61*f* and the fixed electrode finger 62*f* (shown as "A", in the figure) is narrow in comparison to the distance between the movable electrode finger 61*f* and the fixed electrode finger 62*e* (shown as "B" in the figure). The same spatial relationship applies to all of the movable electrode fingers 61*a*-61*f* and the fixed electrode fingers 62*a*-62*f*. Hence the static capacitance between the movable electrode 61 and the fixed electrode 62 can be regarded as being determined simply by the sum of static capacitance between the movable electrode fingers 61*a*-61*f* and the fixed electrode fingers 62*a*-62*f* that has a narrow space therebetween.

In case where the mass portion 40 vibrate in the detecting direction (y-axis direction), the beam 70*b* also vibrate in the same direction. Hence, the detecting member 60 detects the vibration of the beam 70*b* as in the actual detecting operation, however, this means that the detecting member 60 indirectly detects the vibration of the mass portion 40 in the detecting direction (y-axis direction). Since the fixed electrode 62 is fixed to the semiconductor lower layer 10, so when the movable electrode 61 oscillate in accordance with the vibration of the beam 70*b*, the static capacitance between the movable electrode fingers 61*a*-61*f* and the fixed electrode fingers 62*a*-62*f* changes. The detecting member 60 detects this change in the static capacitance by a capacitance detection circuit via the fixed electrode terminal 63. The excitation amplitude of the beam 70*b* in the detecting direction (y-axis direction) is calculated by utilizing of the obtained change of static capacitance, and then the excitation amplitude of the mass portion 40 in the detecting direction (y-axis direction) is converted.

Figure 7:
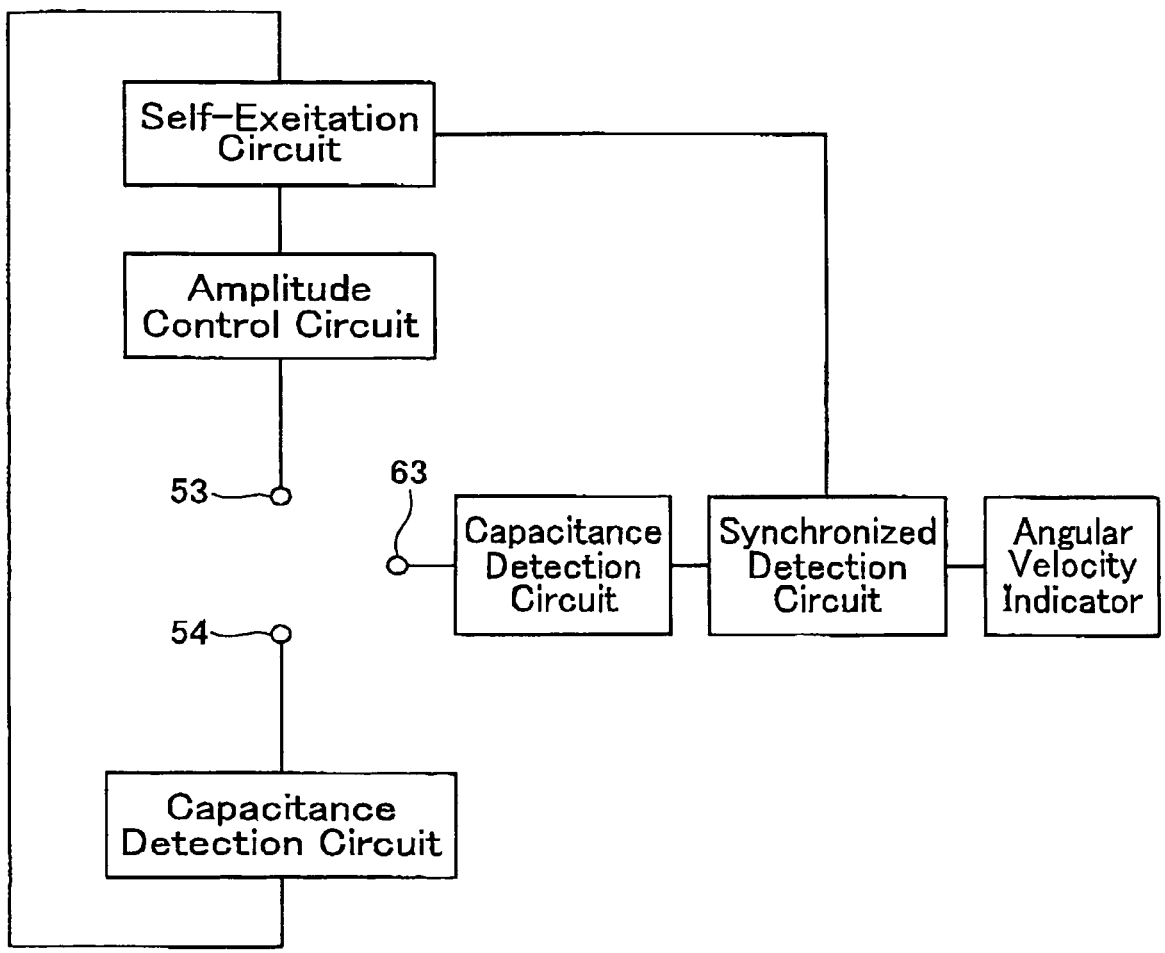
FIG. 7 shows configuration of circuits that are connected with the angular velocity sensor of the first embodiment.

FIG. 7 shows configuration of circuits that are connected with the angular velocity sensor 100. The reference numerals 53, 54, 63 indicates the fixed electrode terminal 53 of the excitation member 50*a*, the fixed electrode terminal 54 of the excitation amplitude detecting member 50*b* and the fixed electrode terminal 63 of the detecting member 60 as shown in FIG. 1. The operation of the angular velocity sensor 100 will be explained with reference to the figures.

First, excitation of the mass portion 40 by the excitation member 50 will be explained. To the fixed electrode terminal 53 of the excitation member 50*a*, AC voltage is applied from the self-excitation circuit via the amplitude control circuit, thereby excitingly vibrates the mass portion 40 in the excitation direction (x-axis direction). As mentioned above, the excitation amplitude detecting member 50*b* utilizes the capacitance detection circuit to detect the excitation amplitude of the mass portion 40 in the excitation direction (x-axis direction) based on the change in the static capacitance in the segmented electrode. The detection result of the capacitance detection circuit is fed back to the self-excitation circuit, which generates self-excitatory signals based on the aforementioned detection results. Based on the excitatory signals, the amplitude control circuit controls the AC voltage so that the excitation amplitude of the mass portion 40 is maintained at a constant level. Employment of the aforementioned configuration enables the mass portion 40 to be stably vibrated in the excitation direction (x-axis direction) at a proper frequency and amplitude.

As mentioned above, the beams 70*a*, 70*b*, 70*c* and 70*d* each comprises the folded type beam 73. Thus, in cases where the mass portion 40 is excited in the excitation direction (x-axis direction), the folded type beam 73 most easily bends in the excitation direction (x-axis direction) among all of the portions of each beam. Thus, in the beam connecting portion 74 and the straight beam 75 that is arranged on the opposite side from the mass portion 40 with respect to the folded type beam 73, the influence of the excitation amplitude of the mass portion 40 is lessened and thereby enables the beam connecting portion 74 and the straight beam 75 to maintain stable state. Therefore, the detecting member 60 arranged on the beam connecting portion 74 can operate detection under a condition in which the influence of the excitation amplitude of the mass portion 40 has been decreased.

When an angular velocity of the rotation axis direction (z-axis direction) is applied upon the mass portion 40 while the mass portion 40 is being excited in the excitation direction (x-axis direction), a coriolis force is generated in the detecting direction (y-axis direction) that is orthogonal to the excitation direction (x-axis direction) of the mass portion 40 and the rotation axis direction (z-axis direction) of the angular velocity. The mass portion 40 is thereby vibrated in the detecting direction (y-axis direction) due to the exertion of the coriolis force.

The folded type beam 73 has a large spring constant in the detecting direction (y-axis direction) and thus is restricted of flexibility in that direction. Thus, when the mass portion 40 is vibrated in the detecting direction (y-axis direction), the straight type beam 75 is most easily yielded to fluctuation in the detecting direction. When the straight type beam 75 is resiliently fluctuated in the detecting direction (y-axis direction), the entirety of the beams 70a, 70b, 70c, 70d are moved in the detecting direction (y-axis direction).

In cases where the beam 70b is vibrated along the detecting direction (y-axis direction), the movable electrode 61 of the detecting member 60 disposed on the beam connecting portion 74 is also vibrated accordingly along the detecting direction (y-axis direction). Due to the fact that the fixed electrode 62 of the detecting member 60 is fixed to the semiconductor lower layer 10, when the movable electrode 61 vibrate in accordance with the wavering of the beam 70b, the static capacitance between the movable electrode fingers 61a-61f and the fixed electrode fingers 62a-62f is deviated. The capacitance detection circuit detects the deviation of the static capacitance by using the fixed electrode terminal 63 of the detecting member 60, and provides the detection result to the synchronized detection circuit. The synchronized detection circuit extracts a specific cycle among the diverse periodical changes of static capacitance that matches with the periodic cycle of the AC voltage generated by the self-excitation circuit. The periodic cycle of the excitation of the mass portion 40 caused by the coriolis force matches with the periodic cycle of the excitation of the mass portion 40 caused by the self-excitation circuit, and also the phase is accelerated by $\pi/2$. Hence, the change (cycle) in the extracted static capacitance indicates the vibration of the mass portion 40 caused by the coriolis force. Furthermore, the synchronized detection circuit calculates the angular velocity from the extracted change in the static capacitance, and provides the result to the angular velocity indicator. The angular velocity indicator displays the angular velocity that is input therein. By employing the aforementioned processes, the angular velocity sensor 100 is capable of detecting an accurate angular velocity imposed on the mass portion 40, who has its rotation axis along the z-axis direction.

Second Embodiment

Figure 8:
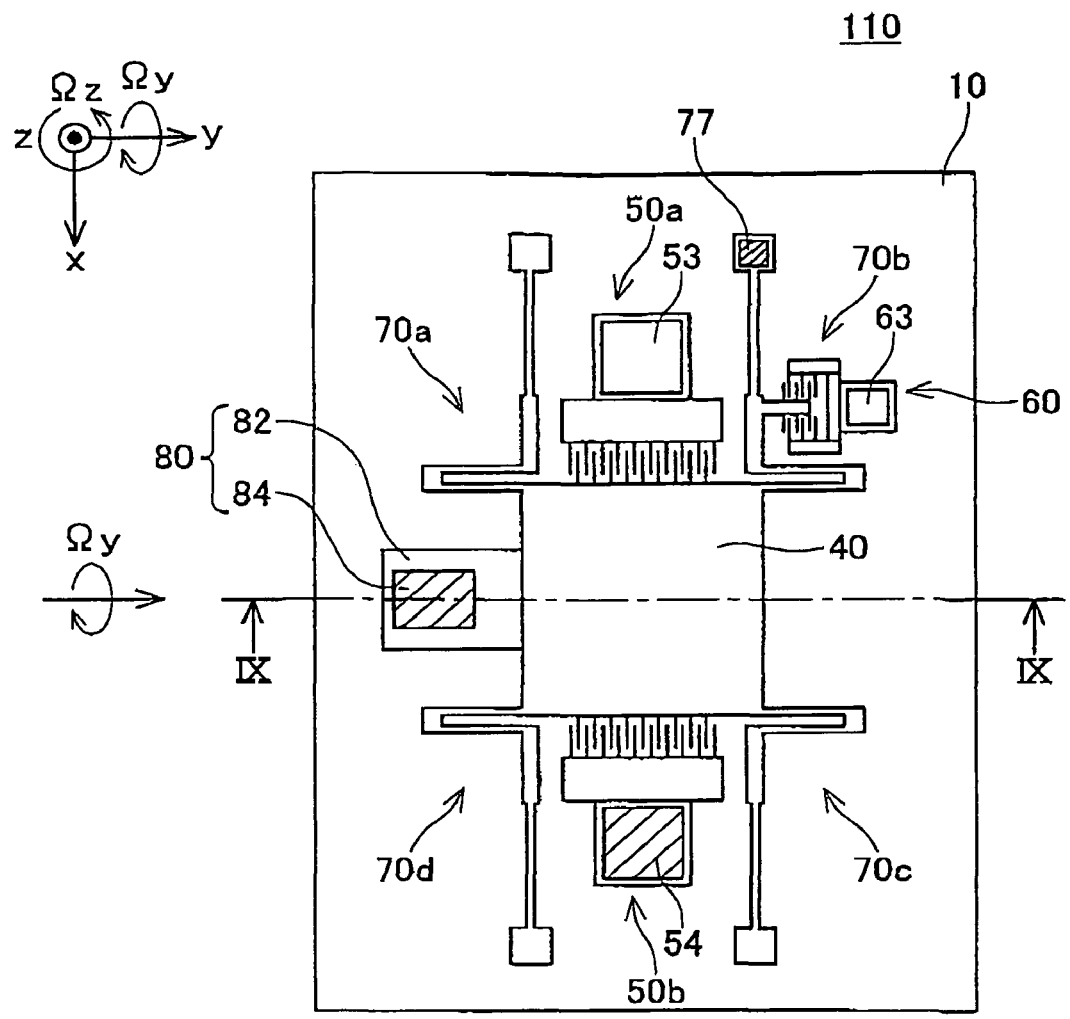
FIG. 8 shows a plan view of an angular velocity sensor of the second embodiment.
Figure 9:
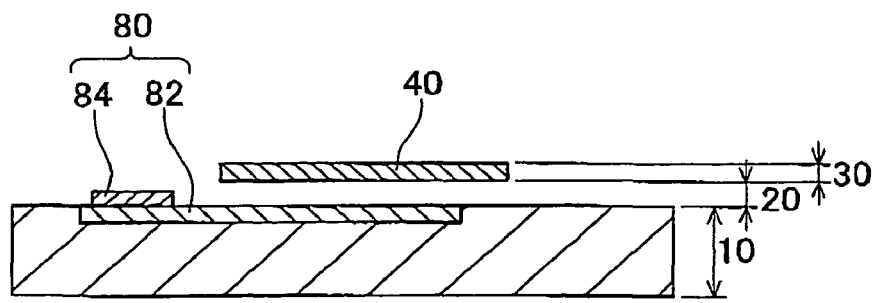
FIG. 9 shows a cross-sectional view along line IX-IX of FIG. 8.

FIGS. 8 and 9 show schematic configuration of the angular velocity sensor 110. FIG. 8 shows a plan view of the angular velocity sensor 110. FIG. 9 shows a cross-sectional view along line IX-IX of FIG. 8. As for the configurations identical to those of the angular velocity sensor 100 of the previous embodiment are given the same reference numerals, and the detailed explanation thereof is omitted.

The angular velocity sensor 110 is characteristic in comprising a second detecting member 80 that directly detects the vibration of the mass portion 40 along the z-axis direction. According to the angular velocity sensor 110 that utilizes the second detecting member 80, it is capable of detecting the angular velocity that has its rotation axis along the y-axis direction. Utilization of the first detecting member 60 as well as the second detecting member 80 enables the angular velocity sensor 110 to detect angular velocities along two different axes.

As shown in FIG. 9, the second detecting member 80 comprises an impurity-diffused area 82 and a fixed electrode terminal 84. The impurity-diffused area 82 is an area in which impurities are introduced to the surface of the semiconductor lower layer 10 in high density, and is thereby conductive. The impurity-diffused area 82 faces the mass portion 40. The fixed electrode terminal 84 is disposed on the surface of the semiconductor lower layer 10, and is electrically connected to the impurity-diffused area 82.

Figure 10:
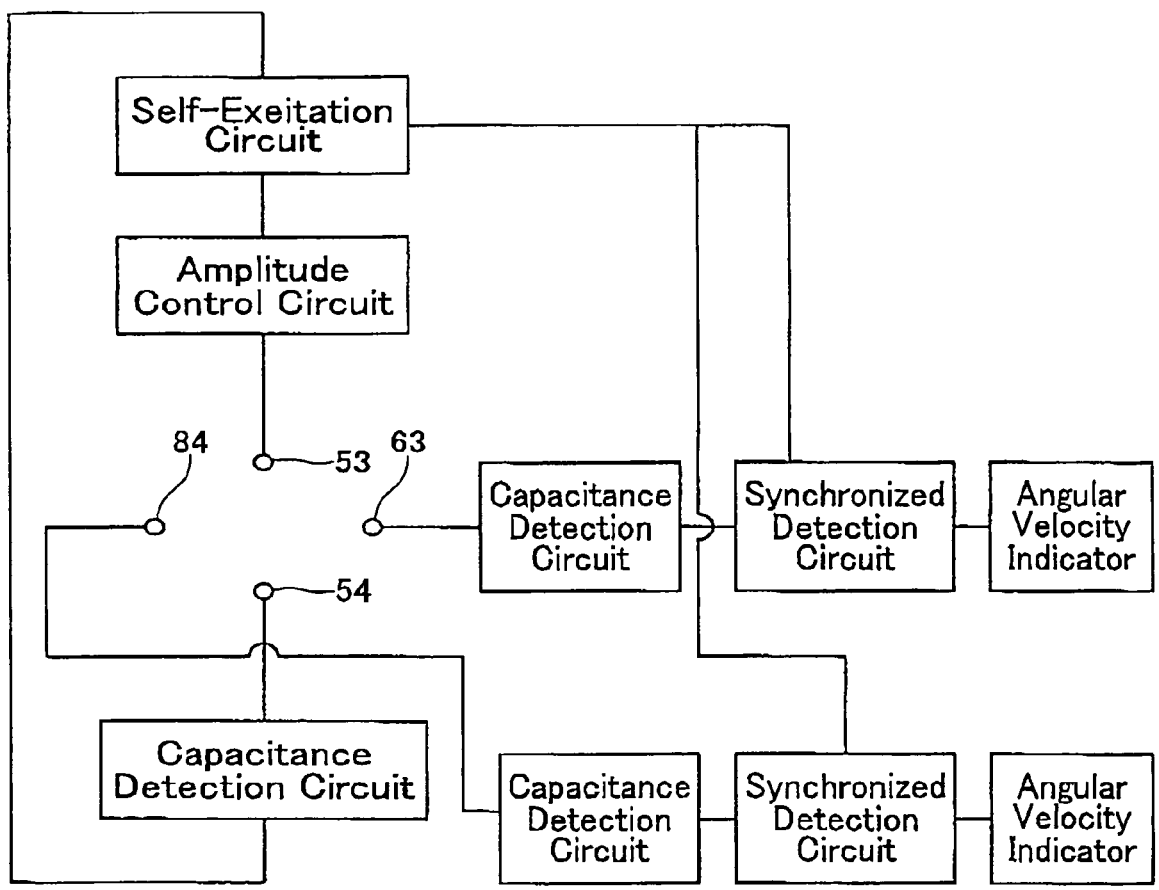
FIG. 10 shows configuration of circuits that are connected with the angular velocity sensor of the second embodiment.

FIG. 10 shows configuration of circuits that are connected with the angular velocity sensor 110. The reference numerals 53, 54, 63, 84 indicate the fixed electrode terminal 53 of the excitation member 50a, the fixed electrode terminal 54 of the excitation amplitude detecting member 50b, the fixed electrode terminal 63 of the detecting member 60 and the fixed electrode terminal 84 of the second detecting member 80 as shown in FIG. 8. The difference of the present circuits from those shown in FIG. 7 lies in the configuration of having a capacitance detection circuit that detects the change in electrostatic capacitance, a synchronized detection circuit to convert the detection result into angular velocity, and an angular velocity indicator to show the angular velocity, all in relation to the second detecting member 80. The basic operation of the angular velocity sensor 110 is the same as that described in FIG. 7.

When an angular velocity of the rotation axis direction (y-axis direction) is applied upon the mass portion 40 while the mass portion 40 is being excited in the excitation direction, a coriolis force is generated in the z-axis direction that is orthogonal to the excitation direction (x-axis direction) of the mass portion 40 and the rotation axis direction (y-axis direction) of the angular velocity. The mass portion 40 is thereby vibrated in the z-axis direction due to the applied coriolis force. When the mass portion 40 is vibrated along the z-axis, the electrostatic capacitance between the mass portion 40 and the impurity-diffused area 82 deviates. The capacitance detection circuit detects the deviation of the static capacitance by using the fixed electrode terminal 84 of the second detecting member 80, and provides the detection result to the synchronized detection circuit. The synchronized detection circuit extracts a specific cycle among the diverse periodical changes of static capacitance that matches with the periodic cycle of the AC voltage generated by the self-excitation circuit. Furthermore, the synchronized detection circuit calculates the angular velocity from the extracted change in the static capacitance, and provides the result to the angular velocity indicator. The angular velocity indicator displays the angular velocity that is input therein. By employing the aforementioned processes, the angular velocity sensor 110 is capable of detecting an accurate angular velocity imposed on the mass portion 40, who has its rotation axis along the y-axis direction.

(Resonance Curves of xyz Axis Excitation System)

Figure 11:
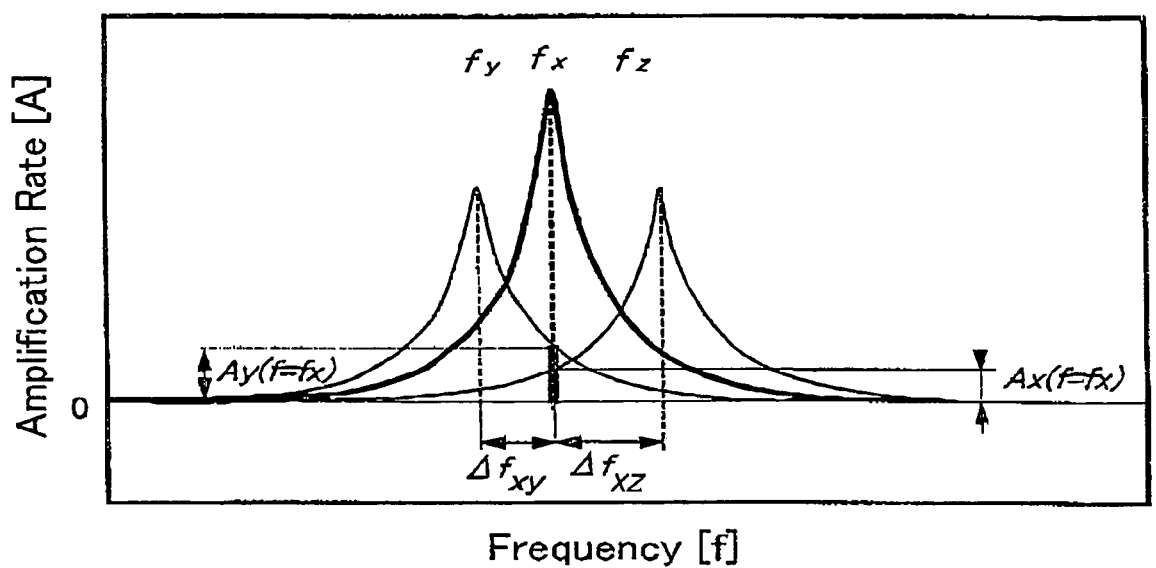
FIG. 11 shows a resonance graph of a xyz axis excitation system.

The favorable configuration of beams 70a, 70b, 70c, 70d in the angular velocity sensor 110 will be discussed. FIG. 11 shows a resonance curves of the xyz axis excitation system. Since the mass portion 40 is excited with an excitation frequency of resonance fx in the angular velocity sensor 110, so that in a case where an angular velocity is applied to the mass portion 40, a vibration that is orthogonal to both the excitation vibration V and the angular velocity Ω is generated. The frequency of the generated vibration is identical to that of the excitation frequency of resonance fx.

The amplification rate Ay of the y-axis excitation system is maximized at the excitation frequency of resonance fy. The amplification rate Ay decreases as it deviates from the excitation frequency of resonance fy. When the absolute difference of the excitation frequency of resonance fx and the frequency of resonances fy in the y-axis as Δfxy, the amplification rate Ay increases in proportion to Δfxy being smaller, and thereby improving the sensor sensitivity of the angular velocity sensor 110. The main factor that determines the sensor sensitivity is Δf. The sensor sensitivity is maximized when Δfxy is zero; however, when fx and fy completely match with each other, the mode of the excitation vibration and the mode of the detecting vibration are coupled, and thus becomes difficult to stably maintain each of the aforesaid modes. That is, even in a case where no coriolis force is applied, a part of the excitation vibration appears in the direction of detecting vibration, and thus undesirably contributes as a noise component. In light of this and in order to stabilize the sensor attributes, it is preferable that Δ fxy is set at least 1% higher than fx. More preferably, Δfxy may be set at least 5% higher than fx. With this configuration, the sensor attribute is significantly stabilized. It should be noted that the same applies to the z-axis excitation system.

The angular velocity sensor 110 detects the angular velocities of the two axes, so that the sensing sensitivity in these two detecting axes (namely the y-axis direction and the z-axis direction) is preferred to be at the same level. When each of the sensor sensitivity is set the same, the model elements for the respective capacitance detection circuit in the y-axis direction and the z-axis direction can be set identically. Furthermore, for the sensor output with respect to the angular velocity applied becomes even by this configuration. This makes it easier to configure a system that utilizes biaxial angular velocity sensors.

As mentioned above, the main factor that determines the sensor sensitivity is Δf. Hence, in order for the respective sensor sensitivity in the y-axis and the z-axis to be substantially the same, it is preferable that Δfxy and Δfxz are substantially equal (Δfxy≈Δ fxz). In order to realize this condition, the excitation frequency of resonance fx should be set in a range between the frequencies of resonance of the two axes. Thus, it is preferable to determine the relation of the excitation frequency of resonance fx, the frequency of resonance fy and the frequency of resonance fz to be either fy<fx<fz or fz<fx<fy.

Furthermore, it is more preferable to set the relation of the aforementioned frequencies of resonance as fy<fx<fz. The reason thereof will be explained below.

In the angular velocity sensor 110 of the present embodiment is produced by utilizing the MEMS technique, whereas a sensor structure is formed above the surface of the semiconductor lower layer 10. In this configuration, there is a tendency in which the spatial distance between the semiconductor lower layer 10 and the mass portion 40 is very small, and that the amount of area in which the semiconductor lower layer 10 and the mass portion 40 face each other becomes fairly large. Hence, a phenomenon in which the mass portion 40 makes contact with the semiconductor lower layer 10 and adhered thereto may happen (i.e. a sticking phenomenon).

To avoid such sticking phenomenon, it is preferable that the stiffness of the beams 70a, 70b, 70c and 70d along the z-axis direction are strengthened. When the stiffness of the beams 70a, 70b, 70c and 70d along the z-axis direction are strengthened, the frequency of resonance in the z-axis direction can be increased. As a result, the relation of the frequency of resonance is set to be fy<fx<fz. In other words, if the relation of the frequency of resonance is set to be fy<fx<fz, sticking phenomenon can be prevented, and the aforementioned sensor attribute can be improved.

Figure 12A:
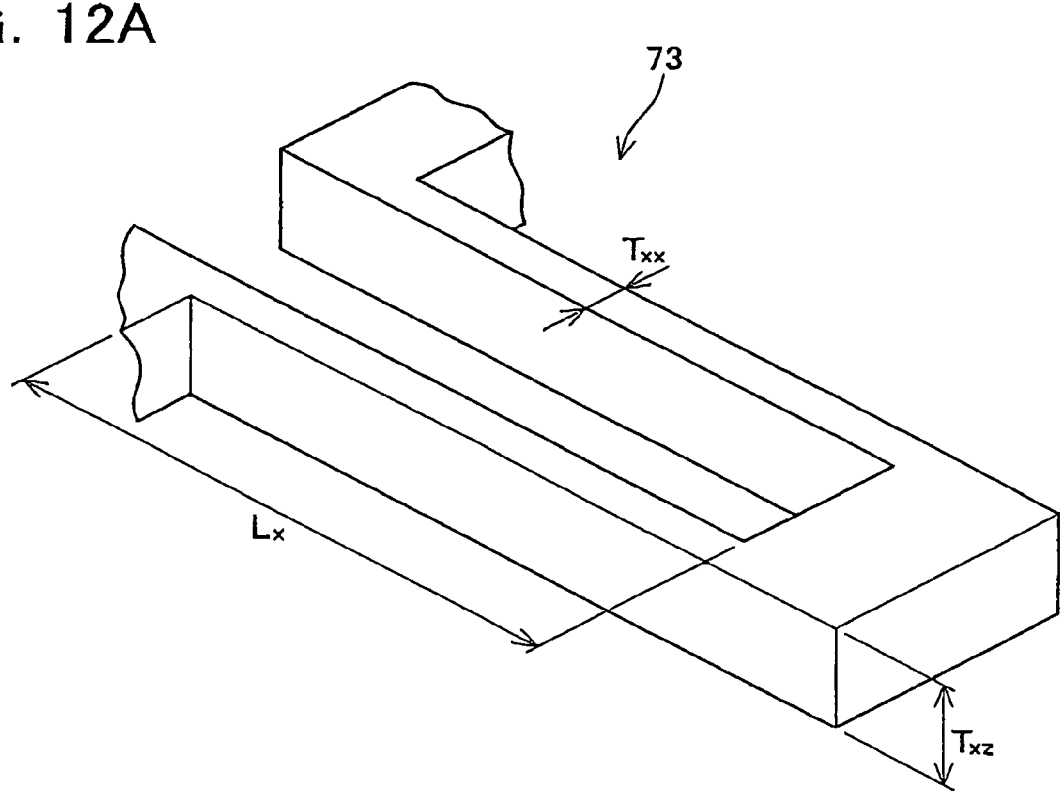
FIG. 12(A) shows a perspective, schematic enlarged view of a folded type beam.
Figure 12B:
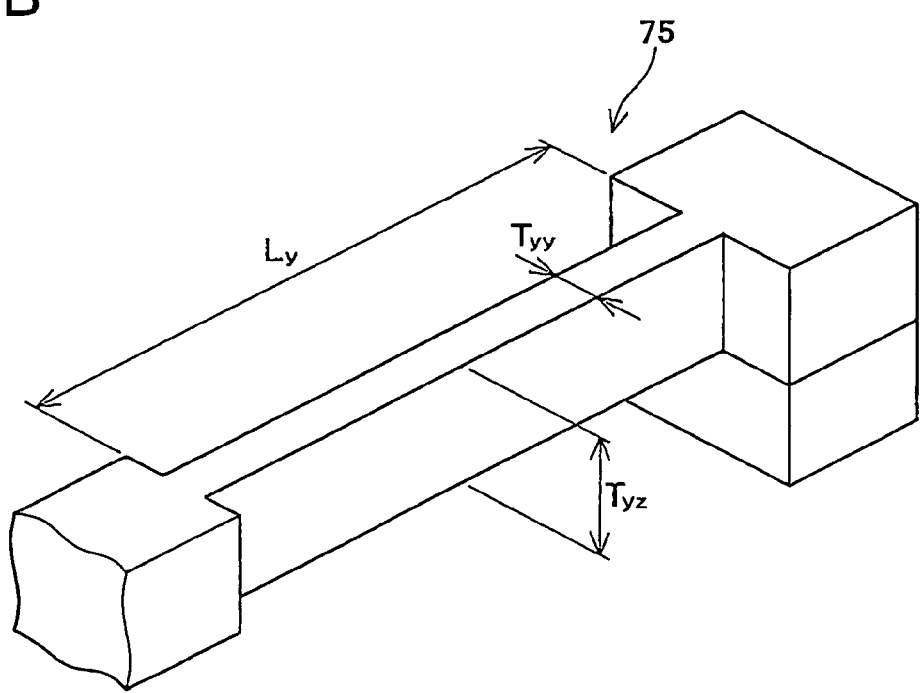
FIG. 12(B) shows a perspective, schematic enlarged view of a straight type beam.

The specific examples of beams 70a, 70b, 70c and 70d of the angular velocity sensor 110 will be discussed. An unlimiting example of setting the relation of frequency of resonance at fy<fx<fz in the beams 70a, 70b, 70c and 70d will be explained. FIG. 12(A) shows a perspective, schematic enlarged view of the folded type beam 73. FIG. 12(B) shows a perspective, schematic enlarged view of the straight type beam 75.

Here, the x-axis beam of the folded type beam 73 and the y-axis beam of the straight type beam 75 will be defined as below.

E: Young's modulus of silicon
Txx: width of the x-axis beam in the x-axis direction
Txz: thickness of the x-axis beam in the z-axis direction
Lx: length of the x-axis beam in the y-axis direction
Tyy: width of the y-axis beam in the y-axis direction
Tyz: thickness of the y-axis beam in the z-axis direction
Ly: length of the y-axis beam in the x-axis direction
M: Mass (represented by the mass of the mass portion 40)

(A Case of Realizing the Vibration of the Mass Portion 40 in the z-Axis Direction by the Folded Type Beam 73)

In regards to the x-axis beam of the folded type beam 73, it is preferable that the thickness Txz is made larger than the width Txx, and the spring constant of the x-axis beam in the z-axis direction is made larger than its spring constant in the x-axis direction. The specific size is desirable to be Txx:Txz=1:1.1 (or more).

In regards to the y-axis beam of the straight type beam 75, it is preferable that the stiffness in the z-axis direction is strengthened more than the stiffness in the y-axis direction, so that the y-axis beam is prohibited of moving along the z-axis direction. The specific size is desirable to be Tyy:Tyz=1:5 (or more).

The calculation method for spring constant of the folded type beam 73 is exemplified below.

When the spring constant of the x-axis beam of the folded type beam 73 in the x-axis direction is defined as kxx and the spring constant in the z-axis direction as kxz, kxx and kxz can be expressed in the formula below. Note that the spring constant in the y-axis direction is significantly large, such that it will not make any contribution to the displacement (fluctuation).

$$kxx = 2\frac{E \cdot Txz \cdot Txx^3}{Lx^3} \quad (1)$$

$$kxz = 2\frac{E \cdot Txx \cdot Txz^3}{Lx^3} \quad (2)$$

The ratio of spring constant kxz and spring constant kxx can be calculated as below.

$$kxz/kxx = \frac{Txz^3}{Txx^2} \qquad (3)$$

If the specific size is set at Txx:Txz=1:1.1, the ratio of the spring constant can be obtained as below.

$$kxz/kxx = 1.21 \qquad (4)$$

Here, the relation of the spring constant and the frequency of resonance can be expressed in the formula below.

$$f = \frac{1}{2\pi}\sqrt{\frac{k}{M}} \qquad (5)$$

The mass M of the mass portion 40 can be regarded as equal among the three axes. Thus, when the excitation frequency of resonance is expressed as fx, and the frequency of resonance are expressed as fy and fz respectively, the relationship thereof is fz:fx=1.1:1. In the case of setting Txx:Txz=1:1.1 or more, the frequency of resonance fz can be raised more than 10% higher than the excitation frequency of resonance fx. By selecting an appropriate size for the x-axis beam of the folded type beam 73, the excitation frequency of resonance fx can be determined to be of an intermediate value between the frequency of resonance fy and the frequency of resonance fz. As its result, the relation of fy<fx<fz and Δfxy=Δfxz can be realized.

The calculation method for spring constant of the straight type beam 75 is exemplified below.

When the spring constant of the y-axis beam of the straight type beam 75 in the y-axis direction is defined as kyy and the spring constant in the z-axis direction as kyz, kyy and kyz can be expressed in the formula below. Note that the spring constant in the x-axis direction is significantly large, such that it will not make any contribution to the displacement (fluctuation).

$$kyy = 4\frac{E \cdot Tyz \cdot Tyy^3}{Ly^3} \qquad (6)$$

$$kyz = 4\frac{E \cdot Tyy \cdot Tyz^3}{Ly^3} \qquad (7)$$

The ratio of spring constant kyz and spring constant kyy can be calculated as below.

$$kyz/kyy = \frac{Tyz^2}{Tyy^3} \qquad (8)$$

If the specific size is set at Tyy:Tyz=1:5 (or more), Tyy/Tyz becomes more than 25; whereas the vibration of the y-axis beam of the straight type beam 75 in the z-axis direction can be regarded as zero.

(A Case of Realizing the Vibration of the Mass Portion 40 in the z-Axis Direction by the Straight Type Beam 75)

In regards to the x-axis beam of the folded type beam 73, it is preferable that the spring constant of the x-axis beam in the z-axis direction is made larger than its spring constant in the x-axis direction such that the displacement difference of the ends of the x-axis beam of the folded type beam 73 in the z-axis direction is substantially zero. The specific size is desirable to be Txx:Txz=1:5 (or more).

In regards to the y-axis beam of the straight type bean 75, it is preferable that the thickness Tyz is made larger than the width Tyy, and the stiffness of the y-axis beam in the z-axis direction is strengthened more than the stiffness in the y-axis direction. The specific size is desirable to be Tyy:Tyz=1:1.1 (or more).

The calculation method for spring constant of the folded type beam 73 is exemplified below.

When the spring constant of the x-axis beam of the folded type beam 73 in the x-axis direction is defined as kxx and the spring constant in the z-axis direction as kxz, kxx and kxz can be expressed in the formula below. Note that the spring constant in the y-axis direction is significantly large, such that it will not make any contribution to the displacement (fluctuation).

$$kxx = 2\frac{E \cdot Txz \cdot Txx^3}{Lx^3} \qquad (9)$$

$$kxz = 2\frac{E \cdot Txx \cdot Txz^3}{Lx^3} \qquad (10)$$

The ratio of spring constant kxx and spring constant kxz can be calculated as below.

$$kxz/kxx = \frac{Txz^2}{Txx^2} \qquad (11)$$

If the specific size is set at Txx:Txz=1:5 (or more), Txx/Txz becomes more than 25; whereas the vibration of the x-axis beam of the folded type beam 73 in the z-axis direction can be regarded as zero.

The calculation method for spring constant of the straight type beam 75 is exemplified below.

When the spring constant of the y-axis beam of the straight type beam 75 in the y-axis direction is defined as kyy and the spring constant in the z-axis direction as kyz, kyy and kyz can be expressed in the formula below. Note that the spring constant in the x-axis direction is significantly large, such that it will not make any contribution to the displacement (fluctuation).

$$kyy = 4\frac{E \cdot Tyz \cdot Tyy^3}{Ly^3} \qquad (12)$$

$$kyz = 4\frac{E \cdot Tyy \cdot Tyz^3}{Ly^3} \qquad (13)$$

The ratio of spring constant kyy and spring constant kyz can be calculated as below.

$$kyz/kyy = \frac{Tyz^2}{Tyy^2} \qquad (14)$$

If the specific size is set at Tyy:Tyz=1:1.1, the ratio of the spring constant can be obtained as below.

$$kxz/kxx = 1.21 \qquad (15)$$

Here, the relation of the spring constant and the frequency of resonance can be expressed in the formula below.

$$f = \frac{1}{2\pi}\sqrt{\frac{k}{M}} \quad (16)$$

The mass M of the mass portion 40 can be regarded as equal among the three axes. Thus, when the excitation frequency of resonance is expressed as fx, and the frequency of resonance are expressed as fy and fz respectively, the relationship thereof is fz:fy=1.1:1. In the case of setting Tyy:Tyz=1:1.1 or more, the frequency of resonance fz can be raised more than 10% higher than the excitation frequency of resonance fy. By selecting an appropriate size for the x-axis beam of the folded type beam 73, the excitation frequency of resonance fx can be determined to be of an intermediate value between the frequency of resonance fy and the frequency of resonance fz. As its result, the relation of fy<fx<fz and Δfxy=Δfxz can be realized.

Figure 13A:
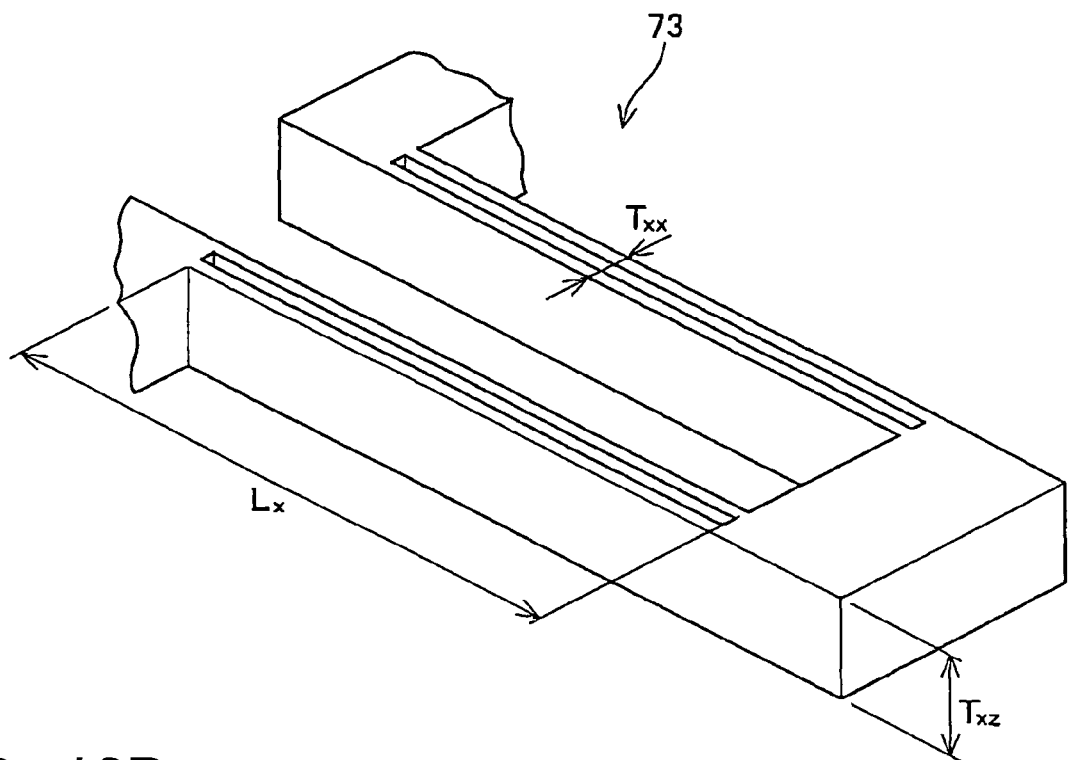
FIG. 13(A) shows a perspective, schematic enlarged view of a variation of the folded type beam.
Figure 13B:
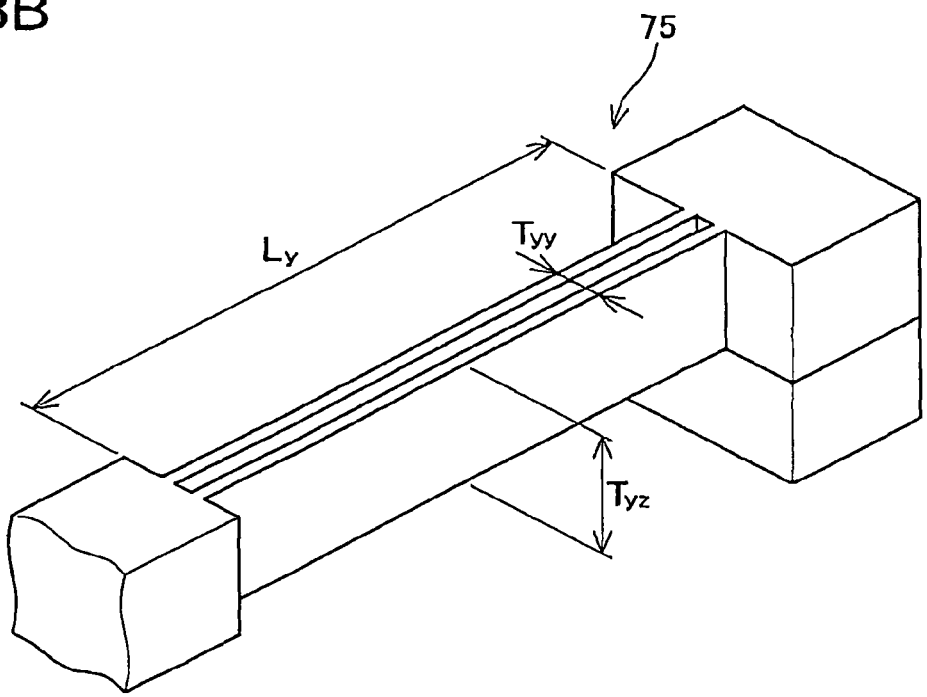
FIG. 13(B) shows a perspective, schematic enlarged view of a variation of the straight type beam.

FIG. 13(A) shows a perspective, schematic enlarged view of a variation of the folded type beam 73. FIG. 13(B) shows a perspective, schematic enlarged view of a variation of the straight type beam 75.

In these variations, the x-axis beam of the folded type beam 73 is constructed of a pair of strips of plates; likewise, the y-axis beam of the straight type beam 75 is also constructed of a pair of strips of plates. With the beams having such shape, the sizes thereof as shown in the figures can be determined in accordance with the aforementioned formulas. The relation of the frequency of resonances fy<fx<fz or fy<fx<fz can also be realized.

Furthermore, with the configuration of the beam being formed of two plates, the beam functions as plate springs; the mass portion 40 is enabled to oscillate parallel to the x-axis direction as well as to the y-axis direction. As a result of this, the movable electrode fingers 61a-61f of the movable electrode 61 and the fixed electrode fingers 62a-62f of the fixed electrode 62 of the detecting member 60 can constantly be facing each other in a parallel manner. With the beam being composed of two plates, a subtle displacement of the static capacitance caused by the vibration of the mass portion 40 can be accurately detected.

Third Embodiment

Figure 14:
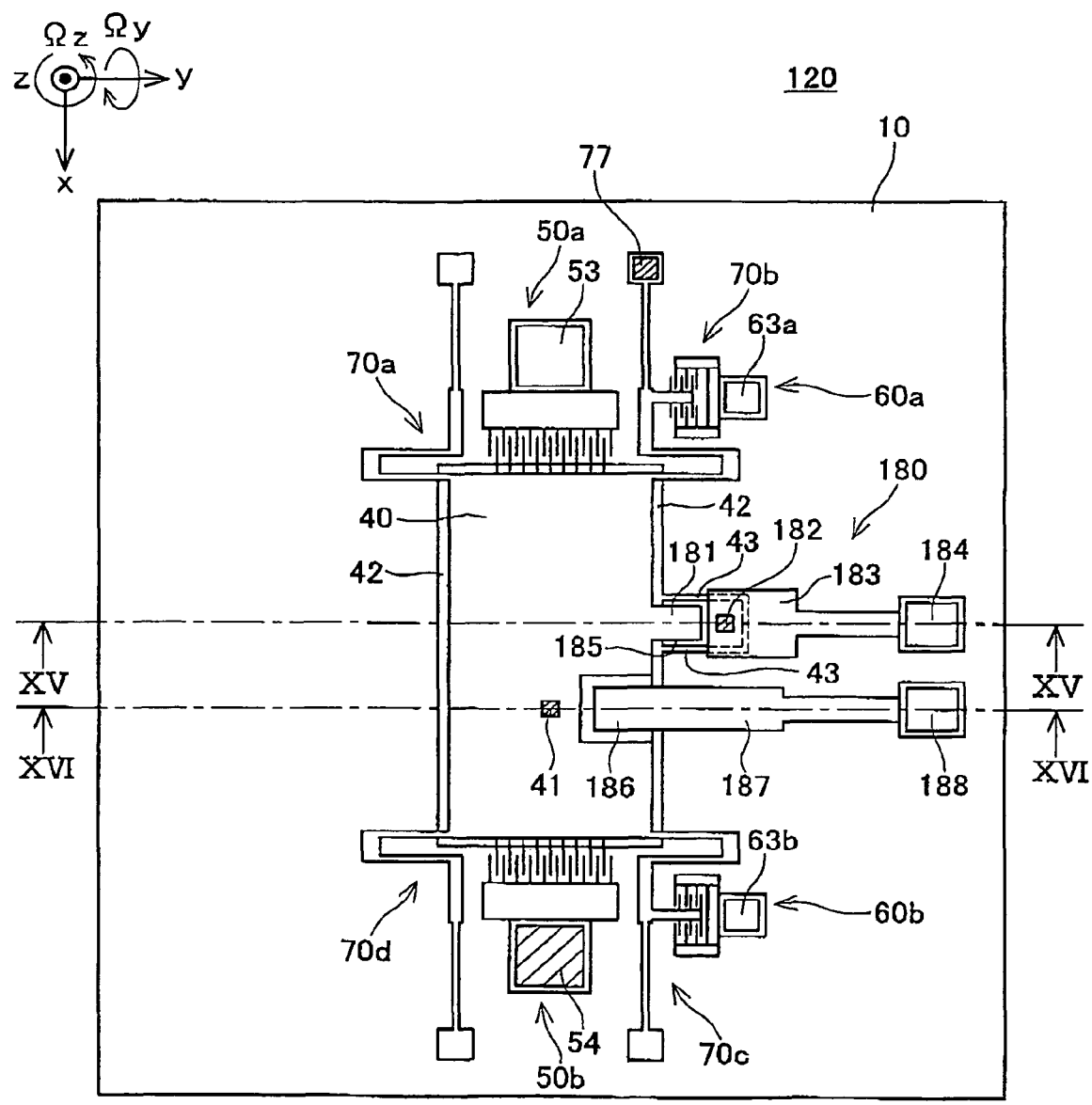
FIG. 14 shows a plan view of an angular velocity sensor of the third embodiment.
Figure 15:
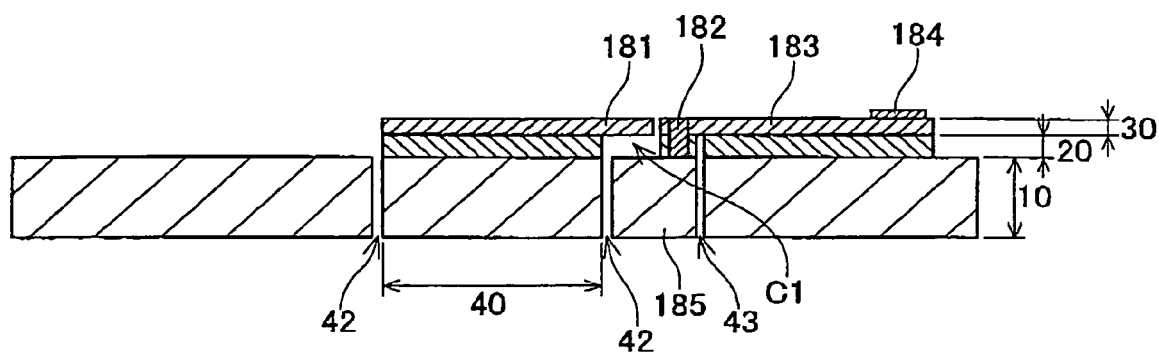
FIG. 15 shows a cross-sectional view along line XV-XV of FIG. 14.
Figure 16:
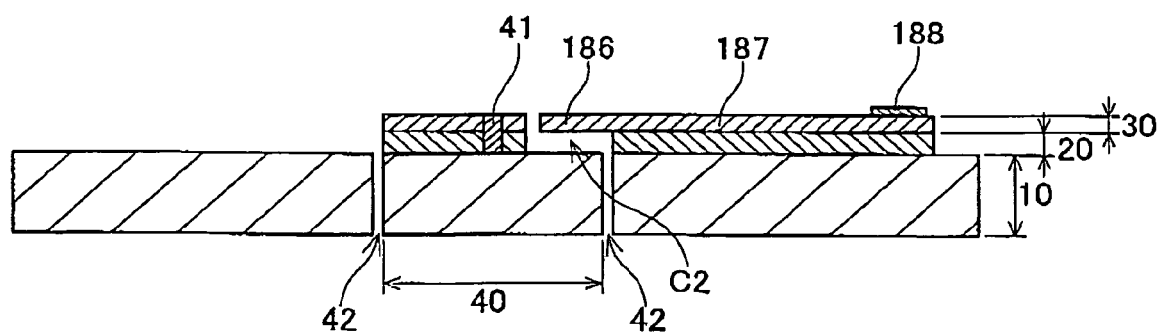
FIG. 16 shows a cross-sectional view along line XVI-XVI of FIG. 14.

A schematic configuration of an angular velocity sensor 120 is given in FIGS. 14-16. FIG. 14 shows a plan view of the angular velocity sensor 120. FIG. 15 shows a cross-sectional view along line XV-XV of FIG. 14. FIG. 16 shows a cross-sectional view along line XVI-XVI of FIG. 14. As for the configurations identical to those of the angular velocity sensor 100 of the first embodiment are given the same reference numerals, and the detailed explanation thereof is omitted.

The angular velocity sensor 120 is characteristic in comprising a second detecting member 180, that directly detects the vibration of the mass portion 40 along the z-axis direction, to be configured of differential electrodes. Furthermore, the angular velocity sensor 120 is also characteristic in having a first analogous detecting electrode 60b disposed on the beam 70c. The first analogous detecting electrode 60b is similar to the first detecting member 60a. The first analogous detecting electrode 60b functions as a differential electrode under a condition in which it is used in combination with the first detecting member 60a.

As shown in FIGS. 15 and 16, the mass portion 40 of the angular velocity sensor 120 is configured with a part of the semiconductor lower layer 10 and the semiconductor upper layer 30 that are stacked together. This configuration differ from those of the angular velocity sensor 100 of the first embodiment and the angular velocity sensor 110 of the second embodiment. A first trench 42 that penetrate through the semiconductor lower layer 10 and the insulating layer 20 is formed around the mass portion 40. The first trench 42 surrounds the peripheral sides of the mass portion 40, and thereby separates the mass portion 40 from the surrounding semiconductor lower layer 10 and the insulating layer 20. The semiconductor lower layer 10 within the mass portion 40 includes a high density of impurities, and thus is endowed with conductivity.

As shown in FIGS. 14-16, the second detecting member 180 of the angular velocity sensor 120 comprises a first arm 181, a first penetrating electrode 182, a first elongated electrode 183, a first fixed electrode terminal 184, an isolated substrate electrode 185, a second arm 186, a second elongated electrode 187 and a second fixed electrode terminal 188.

As shown in FIG. 15, the first arm 181 is formed by utilizing a part of the semiconductor upper layer 30. The first arm 181 is extended above the isolated substrate electrode 185, and is offset from the isolated substrate electrode 185 so as to form a space therebetween. The first arm 181 and the isolated substrate electrode 185 configures a first capacitor C1 by utilizing the space in between the two.

The isolated substrate electrode 185 is formed by utilizing a part of the semiconductor lower layer 10. Around the isolated substrate electrode 185, a second trench that penetrates through the semiconductor lower layer 10 and the insulating layer 20 is formed. The second trench 43 is connected with the first trench 42. The first trench 42 and the second trench 43 surrounds the peripheral sides of the isolated substrate electrode 185, and thereby separates the isolated substrate electrode 185 from the surrounding semiconductor lower layer 10 and insulating layer 20. The isolated substrate electrode 185 includes a high density of impurities, and thus is endowed with conductivity.

The first penetrating electrode 182 penetrates through the insulating layer 20 and the semiconductor upper layer 30, and is electrically connected with the isolated substrate electrode 185 and the first elongated electrode 183. The first elongated electrode 183 is formed by utilizing a part of the semiconductor upper layer 30. The first elongated electrode 183 includes a high density of impurities, and thus is endowed with conductivity. The first fixed electrode terminal 184 is disposed at one end portion of the first elongated electrode 183. With the aforementioned configuration, the isolated substrate electrode 185 is electrically connected with the first fixed electrode terminal 184.

As shown in FIG. 16, the second arm 186 is formed by utilizing a part of the semiconductor upper layer 30. As shown in FIG. 14, the position where the second arm 186 is arranged coincides with the area in which the semiconductor upper layer 30 and the insulating layer 20 of the mass portion 40 has been partially removed; the second arm 186 is arranged in the aforementioned removed area. As shown in FIG. 16, the second arm 186 is extended above the mass portion 40, and is offset from the surface of the mass portion 40 so as to form a space therebetween. The second arm 186 and the semiconductor lower layer 10 of the mass portion 40 configures a second capacitor C2 by utilizing the space in between the two. The second arm 186 can be regarded as being a part of the second elongated electrode 187. A high density of impurity is included in the second elongated electrode 187, which endows the second elongated electrode 187 with conductivity. The second fixed electrode terminal 188 is disposed at one end portion of the second elongated electrode 187.

As shown in FIGS. 14-16, the mass portion 40 comprises a penetrating electrode 41 that penetrates through the insulating layer 20 and the semiconductor upper layer 30 of the mass portion 40. The penetrating electrode 41 is electrically connects the semiconductor upper layer 30 and the semiconductor lower layer 10 of the mass portion 40. As aforementioned, the semiconductor upper layer 30 of the mass portion 40 is fixed to the earth potential via the earth electrode terminal 77 that is arranged on the beam 70*b*. Thus, the semiconductor lower layer 10 of the mass portion 40 is also fixed to the earth potential.

In the second detecting electrode 180, the facing area of the first arm 181 and the isolated substrate electrode 185 of the first capacitor C1 and the facing area of the second arm 186 and the semiconductor lower layer 10 of the mass portion 40 of the second capacitor C2 are identical in its amount. Furthermore, the first capacitor C1 and the second capacitor C2 are both formed with the insulating layer 20 having been removed. Hence, the facing distance between the first arm 181 and the isolated substrate electrode 185 of the first capacitor C1 and the facing distance of the second arm 186 and the semiconductor lower layer 10 of the mass portion 40 of the second capacitor r C2 are also identical.

Thus in the second detecting member 180, when the mass portion 40 is vibrated along the z-axis direction, the increase (or decrease) in the static capacitance of the first capacitor C1 and the decrease (or increase) in the static capacitance of the second capacitor C2 coincide with each other. For example, in a case where the mass portion 40 is displaced in the positive direction along the z-axis direction, the facing distance of the first capacitor C1 increases while its capacitance decreases. At the same time, the facing distance of the second capacitor C2 decreases while its capacitance increases. In a case to the contrary, where the mass portion 40 is displaced in the negative direction along the z-axis direction, the facing distance of the first capacitor C1 decreases while its capacitance increases. At the same time, the facing distance of the second capacitor C2 increases while its capacitance decreases. Due to the aforementioned phenomenon, the displacement (the change) of the static capacitance can be detected with twice as much sensitivity by obtaining the difference between the displacement amount of the capacitance in the first capacitor C1 and the displacement amount of the capacitance in the second capacitor r C2.

As shown in FIG. 14, the first analogous detecting electrode 60*b* is characteristic in having the position at which the movable electrode fingers and the fixed electrode fingers are geared in between each other to be shifted by one (position) in the y-axis direction. Hence, in a case where the mass portion 40 is vibrated in the y-axis direction and the distance between the movable electrode fingers and the fixed electrode fingers of the first detecting electrode 60*a* is decreased, the distance between the movable electrode fingers and the fixed electrode fingers of the first analogous detecting electrode 60*b* is increased. In a case to the contrary, when the distance between the movable electrode fingers and the fixed electrode fingers of the first detecting electrode 60*a* is increased, the distance between the movable electrode fingers and the fixed electrode fingers of the first analogous detecting electrode 60*b* is decreased. The first detecting electrode 60*a* and the first analogous detecting electrode 60*b* differ in the gearing arrangement of the movable fingers and the fixed fingers, however, the other configurations are identical. Thus, when the mass portion 40 is vibrated in the y-axis direction, the increase (or decrease) in the static capacitance of the first detecting member 60*a* and the decrease (or increase) in the static capacitance of the first analogous detecting member 60*b* coincide with each other. Due to the aforementioned phenomenon, the displacement (the change) of the static capacitance can be detected with twice as much sensitivity by obtaining the difference between the displacement amount of the capacitance in the first detecting member 60*a* and the displacement amount of the capacitance in the first analogous detecting member 60*b*.

Figure 17:
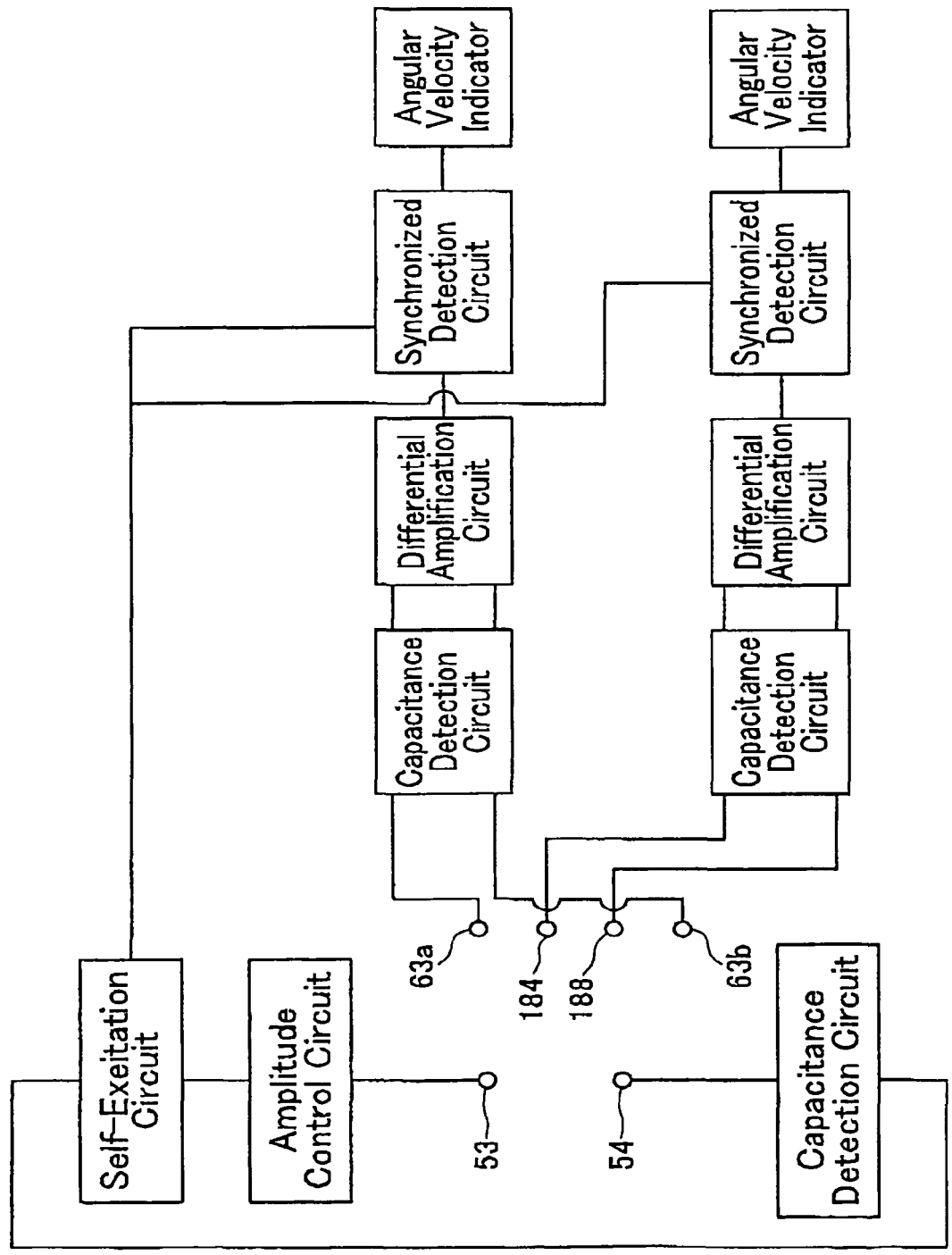
FIG. 17 shows configuration of circuits that are connected with the angular velocity sensor of the third embodiment.

FIG. 17 shows configuration of the circuits that are connected with the angular velocity sensor 120. The reference numerals 53, 54, 63*a*, 63*b*, 184, 188 indicate the fixed electrode terminal 53 of the excitation member 50*a*, the fixed electrode terminal 54 of the excitation amplitude detecting member 50*b*, the fixed electrode terminal 63*a* of the first detecting member 60*a*, the fixed electrode terminal 63*b* of the first analogous detecting member 60*b*, the fixed electrode terminal 184 of the second detecting member 180 and the second fixed electrode terminal 188 of the second detecting member 180 as shown in FIG. 14. The difference of the present circuits from those shown in FIG. 10 lies in the configuration of having a differential amplification circuit. The basic operation of the angular velocity sensor is the same as that described in FIG. 10.

When an angular velocity with the rotation axis along the z-axis direction is applied upon the mass portion 40 while the mass portion 40 is being excited in the excitation direction (x-axis direction), a coriolis force is generated in the y-axis direction that is orthogonal to the excitation direction (x-axis direction) of the mass portion 40 and the rotation axis direction (z-axis direction) of the angular velocity. The mass portion 40 is thereby vibrated along the y-axis direction due to the applied coriolis force. When the mass portion 40 is vibrated along the y-axis, the static capacitance of the first analogous detecting member 60*b* decreases when the electrostatic capacitance in the first detecting member 60*a* increases, while the static capacitance of the first analogous detecting member 60*b* increases when the electrostatic capacitance in the first detecting member 60*a* decreases. As aforementioned, since the increase (or decrease) in the static capacitance of the first detecting member 60*a* and the decrease (or increase) in the static capacitance of the first analogous detecting member 60*b* coincide with each other, the displacement (the change) of the static capacitance can be detected with twice as much sensitivity by obtaining the difference between the displacement amount of the capacitance in the first detecting member 60*a* and the displacement amount of the capacitance in the first analogous detecting member 60*b*. The detected change in the capacitance is provided to the synchronized detection circuit. The synchronized detection circuit extracts a specific cycle among the diverse periodical changes of static capacitance that matches with the periodic cycle of the AC voltage generated by the self-excitation circuit. The angular velocity with the rotation axis in the z-axis direction that has been applied to the mass portion 40 can be detected with high quality in the detecting accuracy. The detected angular velocity is then indicated with the angular velocity indicator.

Furthermore, when an angular velocity with the rotation axis along the y-axis direction is applied upon the mass portion 40 while the mass portion 40 is being excited in the excitation direction (x-axis direction), a coriolis force is generated in the z-axis direction that is orthogonal to the excitation direction (x-axis direction) of the mass portion 40 and the rotation axis direction (y-axis direction) of the angular velocity. The mass portion 40 is thereby vibrated along the z-axis direction due to the applied coriolis force. When the mass portion 40 is vibrated along the z-axis, change in capacitance as below occurs in the second detecting member 180. The static capacitance of the second capacitor C2 decreases when the electrostatic capacitance in the first capacitor C1 increases, while the static capacitance of the second capacitor C2 increases when the electrostatic capacitance in the first capacitor C1 decreases. As aforementioned, since the increase (or decrease) in the static capacitance of the first capacitor C1 and the decrease (or increase) in the static capacitance of the second capacitor C2 coincide with each other. Hence, by calculating the difference of the aforementioned displacements of capacitance with the differential amplification circuit, the displacement of capacitance can be detected with twice as much sensitivity. The detected change in the capacitance is provided to the synchronized detection circuit. The synchronized detection circuit extracts a specific cycle among the diverse periodical changes of static capacitance that matches with the periodic cycle of the AC voltage generated by the self-excitation circuit. The angular velocity with the rotation axis in the y-axis direction that has been applied to the mass portion 40 can be detected with high quality in the detecting accuracy. The detected angular velocity is then indicated with the angular velocity indicator.

A Variation of the Third Embodiment

Figure 18:
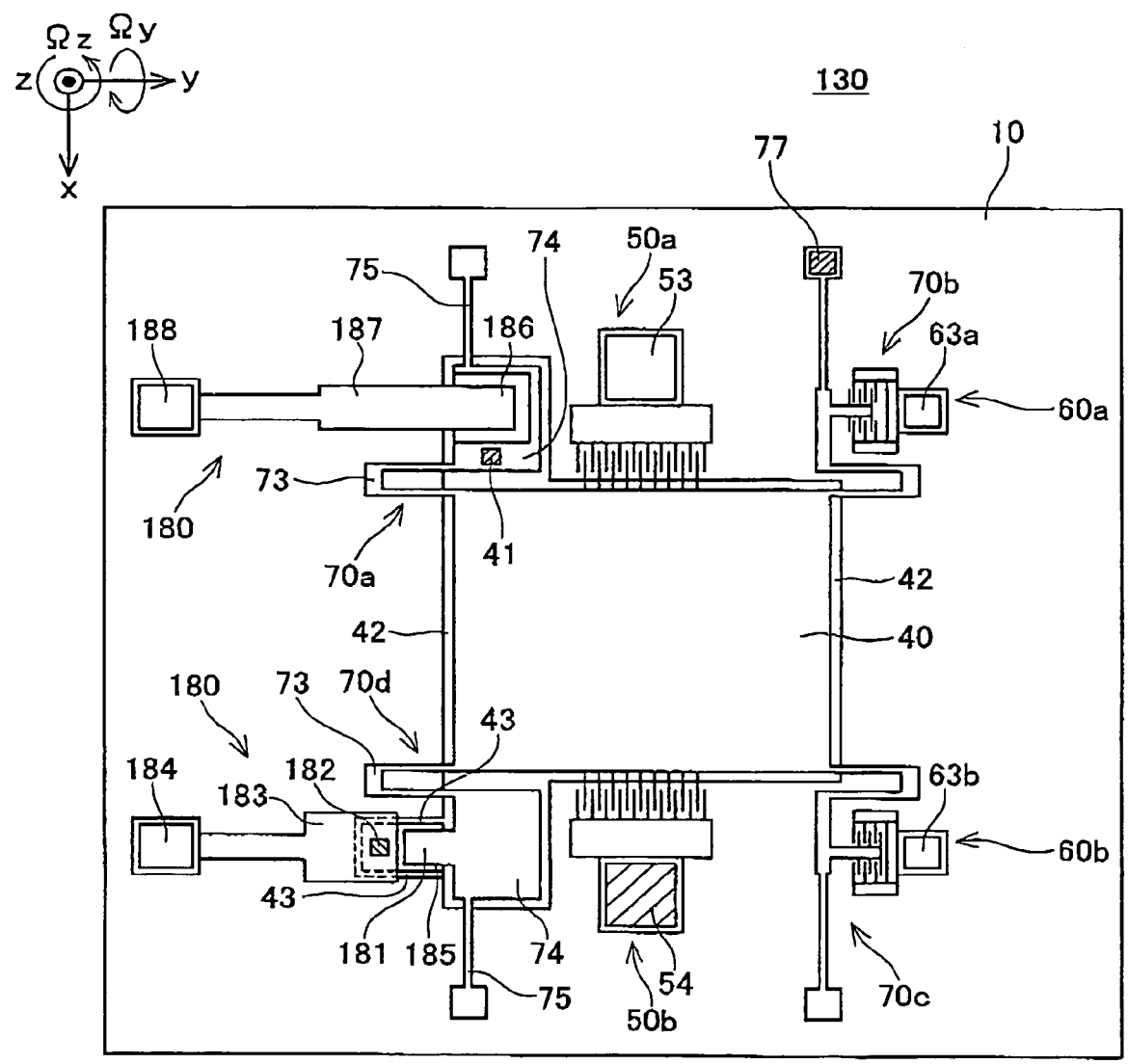
FIG. 18 shows a plan view of a variation of the angular velocity sensor of the third embodiment.

FIG. 18 shows a plan view of an angular velocity sensor 130, which is a variation of the angular velocity sensor of the third embodiment.

The angular velocity sensor 130 is characteristic in having the second detecting electrode 180 on the beams 70a and 70d. The second arm 186, the second elongated electrode 187 and the second fixed electrode terminal 188 of the second detecting electrode 180 are arranged to the beam connecting portion 74 of the beam 70a. The first arm 181, the first penetrating electrode 182, the first elongated electrode 183, the first fixed electrode terminal 184 and the isolated substrate electrode 185 of the second detecting electrode 180 are arranged to the beam connecting portion 74 of the beam 70d. The difference of the angular velocity sensor 130 from the angular velocity sensor 120 shown in FIG. 17 lies in the configuration of having the second detecting electrode 180 on the beams 70a and 70d, however, the basic operation of the angular velocity sensor is the same as the angular velocity sensor 120 described in FIG. 14.

In the angular velocity sensor 130, the vibration of the mass portion 40 in the z-axis direction is materialized by the straight type beam 75. That is, the spring constant in the z-axis direction of the beams 70a, 70b, 70c, 70d of the folded type beam 73 is higher than the spring constant in the z-axis direction of the straight type beam 75. An example of such beams 70a, 70b, 70c, 70d is described earlier in relation to the calculation method for spring constant of the beam.

In the angular velocity sensor 130, in cases where the mass portion 40 is excited in the excitation direction (x-axis direction), the folded type beam 73 most easily bends in the excitation direction (x-axis direction) among all of the portions of each beam. Thus, the second detecting member 180 arranged on the beam connecting portion 74 can operate detection under a condition in which the influence of the excitation amplitude of the mass portion 40 has been decreased. When an angular velocity of the rotation axis direction (y-axis direction) is applied upon the mass portion 40 while the mass portion 40 is being excited in the excitation direction (x-axis direction), a coriolis force is generated in the detecting direction (z-axis direction) that is orthogonal to the excitation direction (x-axis direction) of the mass portion 40 and the rotation axis direction (y-axis direction) of the angular velocity. The mass portion 40 is thereby vibrated in the detecting direction (z-axis direction) due to the applied coriolis force.

The folded type beam 73 has a large spring constant in the detecting direction (z-axis direction) and thus is restricted of flexibility in that direction. Thus, when the mass portion 40 is vibrated in the detecting direction (z-axis direction), the straight type beam 75 is most easily yielded to fluctuation in the detecting direction. When the straight type beam 75 is resiliently fluctuated in the detecting direction (z-axis directions, the entirety of the beams 70a, 70b, 70c, 70d are moved in the detecting direction (z-axis direction). Hence, the second detecting electrode 180 is capable of indirectly detecting the vibration of the mass portion 40 in the taxis direction based on the vibration of the beam connecting portion 74 in the z-axis direction. Angular velocity sensors as modified as in the angular velocity sensor 130 is, by having the second detecting member 180 on the beam connecting portion 74, capable of carrying out the detection operation under a condition in which the influence of the excitation amplitude of the mass portion 40 is decreased.

Fourth Embodiment

Figure 19:
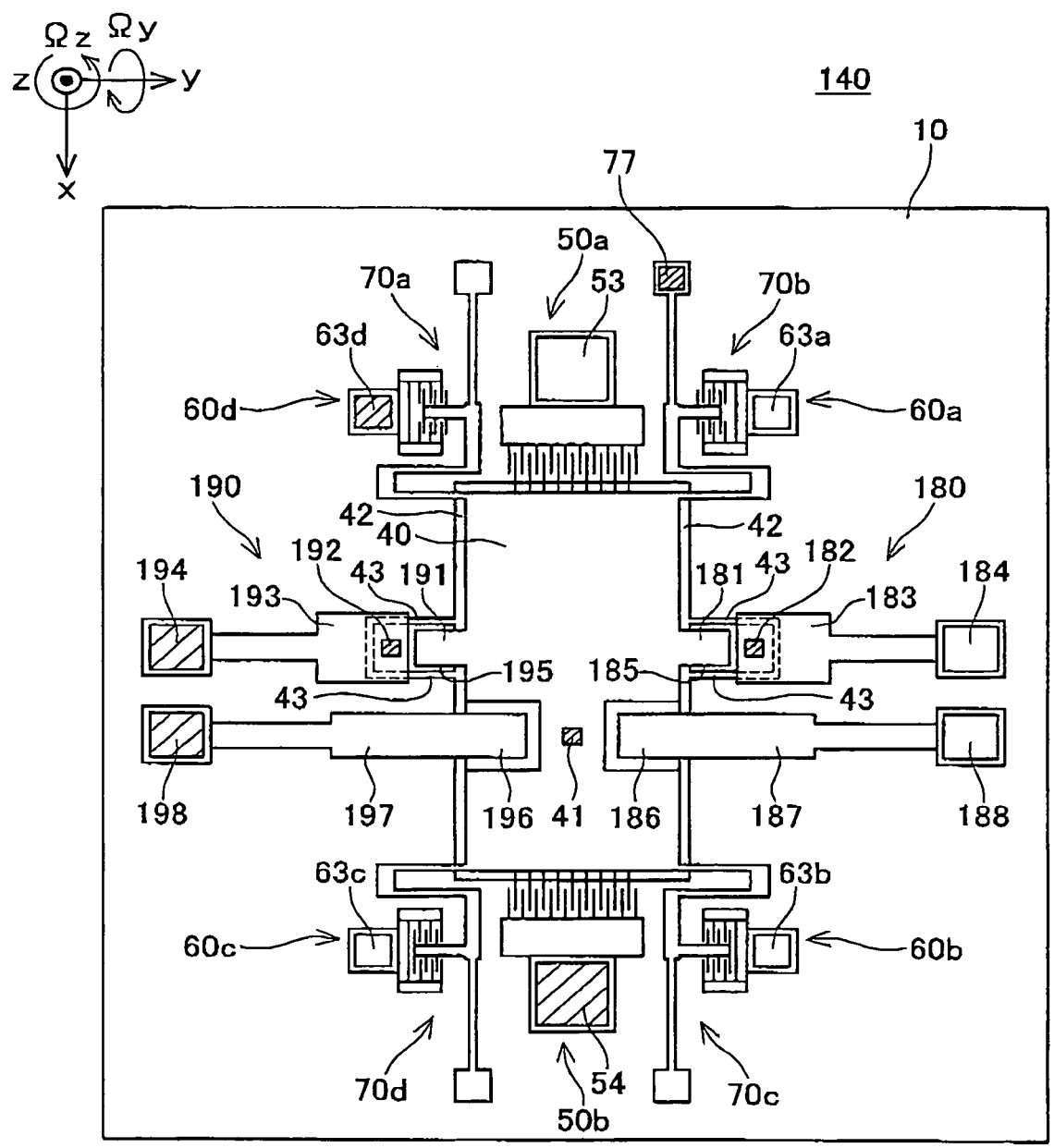
FIG. 19 shows a plan view of an angular velocity sensor of the fourth embodiment.

A schematic configuration of an angular velocity sensor 140 is given in FIG. 19. FIG. 19 shows a plan view of the angular velocity sensor 140. As for the configurations identical to those of the angular velocity sensor 120 of the third embodiment are given the same reference numerals, and the detailed explanation thereof is omitted.

The angular velocity sensor 140 is characteristic in having a first y-axis vibration amplitude controlling member 60d that is disposed on the beam 70a, and a second y-axis vibration amplitude controlling member 60c that is disposed on the beam 70d. The first y-axis vibration amplitude controlling member 60d comprises a configuration substantially identical to the first detecting member 60a. The second y-axis vibration amplitude controlling member 60c comprises a configuration substantially identical to the first y-axis vibration amplitude controlling member 60b. Furthermore, the angular velocity sensor 140 is also characteristic in having a z-axis vibration amplitude controlling member 190 that comprises a substantially identical configuration as the second detecting member 180.

The first y-axis vibration amplitude controlling member 60d and the second y-axis vibration amplitude controlling member 60c are applied with AC voltage such that the mass portion 40 is prohibited from being vibrated in the y-axis direction. The z-axis vibration amplitude controlling member 190 is applied with AC voltage such that the mass portion 40 is prohibited from being vibrated in the z-axis direction.

Figure 20:
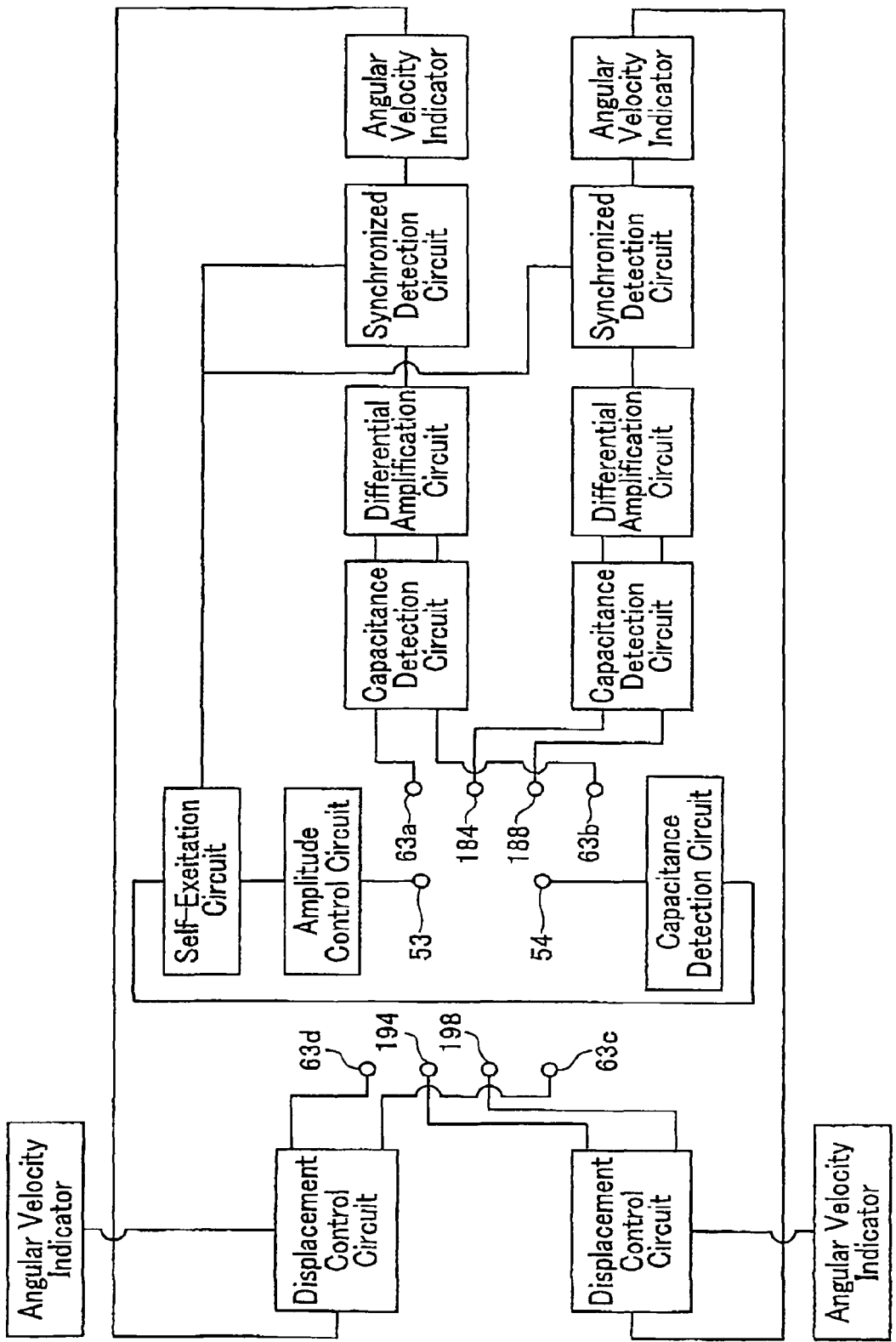
FIG. 20 shows configuration of circuits that are connected with the angular velocity sensor of the fourth embodiment.

FIG. 20 shows configuration of circuits that are connected with the angular velocity sensor 140. The reference numerals 53, 54, 63a, 63b, 63c, 63d, 184, 188, 194, 198 indicate the fixed electrode terminal 53 of the excitation member 50a, the fixed electrode terminal 54 of the excitation amplitude detecting member 50b, the fixed electrode terminal 63a of the first detecting member 60a, the fixed electrode terminal 63b of the first analogous detecting member 60b, the fixed electrode terminal 63c of the second y-axis vibration amplitude control member 60c, the fixed electrode terminal 63d of the first y-axis vibration amplitude control member 60d, the fixed electrode terminal 184 of the second detecting member 180, the second fixed electrode terminal 188 of the second detecting member 180, the first fixed electrode terminal 194 of the z-axis vibration amplitude control member 190 and the second fixed electrode terminal 198 of the z-axis vibration amplitude control member 190 as shown in FIG. 18. The difference of the present circuits from those shown in FIG. 17 lies in the configuration of having a displacement control circuit. The basic operation of the angular velocity sensor is the same as that described in FIG. 17.

In the angular velocity sensor 140, the result regarding the vibration in the y-axis direction that has been detected by the synchronized detection circuit is provided to the displacement control circuit. Based on the provided results, the displacement control circuit controls the AC voltages that are applied to the first y-axis vibration amplitude controlling member 60d and the second y-axis vibration amplitude controlling member 60c such that the displacement of the mass portion 40 along the y-axis direction is controlled to be zero. Furthermore, the angular velocity along the z-axis direction is calculated from the AC voltages that are necessary for controlling the displacement of the mass portion 40 along the y-axis direction to be zero, and the result thereof is displayed by the angular velocity indicator.

Likewise in the angular velocity sensor 140, the result regarding the vibration in the z-axis direction that has been detected by the synchronized detection circuit is provided to the displacement control circuit. Based on the provided results, the displacement control circuit controls the AC voltage that is applied to the z-axis vibration amplitude controlling, member 190 such that the displacement of the mass portion 40 along the z-axis direction is controlled to be zero. Furthermore, the angular velocity along the y-axis direction is calculated from the AC voltage that is necessary for controlling the displacement of the mass portion 40 along the z-axis direction to be zero, and the result thereof is displayed by the angular velocity indicator.

In the angular velocity sensor 140, the angular velocities can be detected in a highly accurate manner by utilizing the zero method.

The specific embodiments of the present invention are described above, but these merely illustrate some possibilities of the invention and do not restrict the claims thereof. The art set forth in the claims includes transformations and modifications to the specific examples set forth above.

The technical elements disclosed in the specification or the drawings may be utilized separately or in all types of combinations, and are not limited to the combinations set forth in the claims at the time of filing of the application. Furthermore, the art disclosed herein may be utilized to simultaneously realize a plurality of aims or to realize one of these aims.

What is claimed is:

1. An angular velocity sensor comprising:
a substrate;
a mass portion;
an excitation member that excites the mass portion along an excitation direction parallel to a surface of the substrate;
a beam supporting the mass portion so that the mass portion is capable of being displaced at least along (1) the excitation direction, (2) a first detecting direction that is orthogonal to the excitation direction and parallel to the surface of the substrate, and (3) a second detecting direction that is orthogonal to the surface of the substrate, the beam including a first portion and a second portion, one end of the beam being connected with the mass portion and another end of the beam being connected with the substrate;
a first detecting member disposed on the beam, the first detecting member detecting a vibration of the beam along the first detecting direction; and
a second detecting member that directly or indirectly detects a vibration of the mass portion along the second detecting direction, wherein
a spring constant of the first portion along the excitation direction is lower than a spring constant of the first portion along the first detecting direction, and a spring constant of the second portion along the first detecting direction is lower than a spring constant of the second portion along the excitation direction,
the first portion is arranged closer to the mass portion than the second portion, and
the first detecting member is disposed on a farther beam portion of the beam, wherein the farther beam portion is arranged farther away from the mass portion than the first portion.

2. The angular velocity sensor according to claim 1, wherein
the first portion is a folded type beam including a pair of beams extending along the first detecting direction, and
the second portion is a straight type beam including a straight beam extending along the excitation direction.

3. The angular velocity sensor according to claim 1, wherein the second detecting member comprises
a first arm extending from the mass portion and facing a surface of a part of the substrate with a space therebetween, and
a second arm extending from the substrate and facing a surface of a part of the mass portion with a space therebetween, wherein
a first capacitor is configured of the first arm and the part of the substrate,
a second capacitor is configured of the second arm and the part of the mass portion, and
when the mass portion is displaced along the second detecting direction, the space in one of the first capacitor and the second capacitor becomes broader, and the space in the other of the first capacitor and the second capacitor becomes narrower.

4. The angular velocity sensor according to claim 1, wherein
a spring constant of the first portion along the second detecting direction is higher than a spring constant of the second portion along the second detecting direction, and
the second detecting member is disposed on the farther beam portion.

5. The angular velocity sensor according to claim 4, wherein the second detecting member further comprises
a third arm extending from the farther beam portion and facing the surface of a part of the substrate with a space therebetween, and
a fourth arm extending from the substrate and facing the surface of a part of the farther beam portion with a space therebetween, wherein
a third capacitor is configured of the third arm and the part of the substrate,
a fourth capacitor is configured of the fourth arm and the part of the farther beam portion, and
when the farther beam portion is displaced along the second detecting direction, the space of one of the third capacitor and the fourth capacitor becomes broader, and the space of the other of the third capacitor and the fourth capacitor becomes narrower.

6. The angular velocity sensor according to claim 1, wherein, in a case where
an excitation frequency of resonance along the excitation direction based on the mass portion and the beam is fx, a frequency of resonance along the first detecting direction based on the mass portion and the beam is fy, and a frequency of resonance along the second detecting direction based on the mass portion and the beam is fz, one of the following relation (1) and (2) is obtained:

$$fy<fx<fz \quad (1)$$

$$fz<fx<fy. \quad (2)$$

7. The angular velocity sensor according to claim 6, wherein, in a case where an absolute value of difference between the excitation frequency of resonance fx and the frequency of resonance fy is Δfxy, and an absolute value of difference between the excitation frequency of resonance fx and the frequency of resonance fz is Δfxz, Δfxy and Δfxz are substantially equal.

8. An angular velocity sensor comprising:

a substrate;

a mass portion;

an excitation member that excites the mass portion along an excitation direction;

a beam supporting the mass portion so that the mass portion is capable of being displaced at least along (1) the excitation direction and (2) a detecting direction that is orthogonal to the excitation direction and a surface of the substrate, the beam including a first portion and a second portion, wherein one end of the beam is connected with the mass portion and another end of the beam is connected with the substrate; and a detecting member disposed on the beam, the detecting member detecting a vibration of the beam along the detecting direction, wherein a spring constant of the first portion along the excitation direction is lower than a spring constant of the first portion along the detecting direction, and a spring constant of the second portion along the detecting direction is lower than a spring constant of the second portion along the excitation direction, the first portion is arranged closer to the mass portion than the second portion, and the detecting member is disposed on a farther beam portion of the beam, wherein the farther beam portion is arranged farther away from the mass portion than the first portion.

* * * * *